(12) United States Patent
Iwasaki et al.

(10) Patent No.: US 7,584,995 B2
(45) Date of Patent: Sep. 8, 2009

(54) ACTUATABLE KNEE BOLSTER

(75) Inventors: Akihiro Iwasaki, Utsunomiya (JP);
Junichi Nishimura, Shimotsuke (JP);
Hiroaki Koike, Mouka (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 11/820,057

(22) Filed: Jun. 18, 2007

(65) Prior Publication Data
US 2008/0007039 A1    Jan. 10, 2008

(30) Foreign Application Priority Data

| Jun. 22, 2006 | (JP) | ............................. 2006-172618 |
| Aug. 31, 2006 | (JP) | ............................. 2006-236604 |
| Aug. 31, 2006 | (JP) | ............................. 2006-236605 |

(51) Int. Cl.
*B60R 21/045* (2006.01)
(52) U.S. Cl. ...................... 280/753; 280/752
(58) Field of Classification Search ................. 280/753, 280/752, 751, 750
See application file for complete search history.

(56) References Cited

U.S. PATENT DOCUMENTS 4,951,963 A * 8/1990 Behr et al. .................. 280/753
2005/0067214 A1 * 3/2005 Tanaka et al. ............... 180/446
2005/0110250 A1 * 5/2005 Funakura et al. ......... 280/730.1

FOREIGN PATENT DOCUMENTS

| JP | 2004-268713 | 9/2004 |
| JP | 2005-096525 | 4/2005 |
| JP | 2005-280461 | 10/2005 |
| JP | 2005-297839 | 10/2005 |

* cited by examiner

*Primary Examiner*—Ruth Ilan
*Assistant Examiner*—Keith Frisby
(74) *Attorney, Agent, or Firm*—Carrier, Blackman & Associates, P.C.; Joseph P. Carrier; William D. Blackman

(57) ABSTRACT

An actuatable knee bolster provided in an instrument panel of a vehicle to protect lower legs of an occupant seated in a front seat of the vehicle. The actuatable knee bolster includes: an opposing section opposed to the lower legs of the occupant; a driving section driving the opposing section to move toward and away from the occupant; and a shock absorbing section configured to be plastically deformed when making contact with the lower legs of the occupant. In the actuatable knee bolster, the driving section is disposed inside the shock absorbing section.

11 Claims, 18 Drawing Sheets

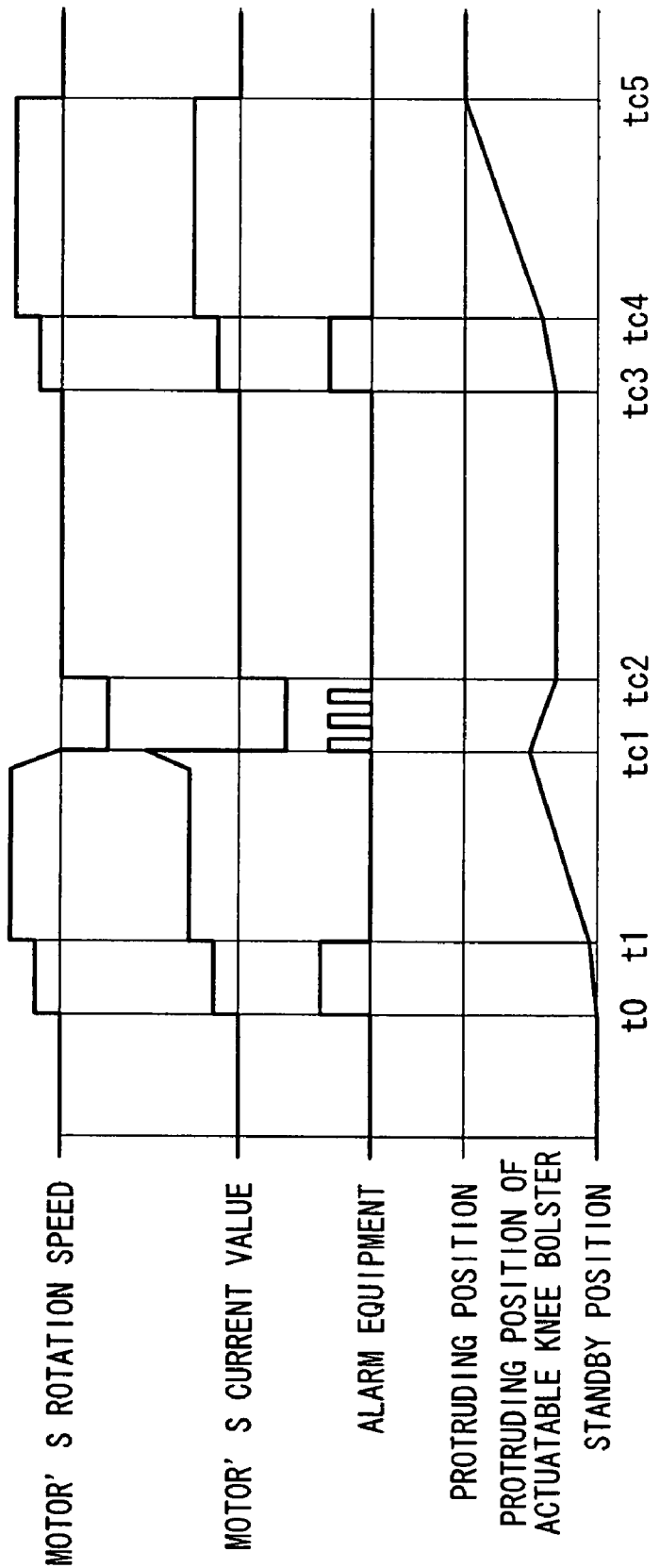

ACTUATABLE KNEE BOLSTER

BACKGROUND OF THE INVENTION

1. Field of the Invention

The present invention relates to an actuatable knee bolster.

This application claims priority from Japanese Patent Application No. 2006-172618, filed on Jun. 22, 2006, Japanese Patent Application No. 2006-236604, filed on Aug. 31, 2006, and Japanese Patent Application No. 2006-236605, filed on Aug. 31, 2006, the contents of which are incorporated herein by reference.

2. Description of Related Art

An actuatable knee bolster is known which is provided in an instrument panel of a vehicle to protect an occupant seated in a front seat of the vehicle.

The actuatable knee bolster moves an opposing section opposed to the lower legs of the occupant toward the lower legs by driving a driving section so that the opposing section supports the lower legs of the occupant at the time of a vehicle collision so as to maintain the occupant's posture.

The actuatable knee bolster includes a shock absorbing section that is plastically deformed when receiving a great load from the occupant so as to absorb an impact.

Japanese Unexamined Patent Application, First Publication No. 2005-280461 discloses an actuatable knee bolster in which a driving section for driving an opposing section to extend and retreat has a shock absorbing function.

Japanese Unexamined Patent Application, First Publication No. 2005-096525 discloses an actuatable knee bolster in which a driving unit is disposed outside a shock absorbing section.

As disclosed in Japanese Unexamined Patent Application, First Publication No. 2005-280461, when an actuatable knee bolster has a structure in which a driving section for driving an opposing section to extend and retreat has a shock absorbing function, it is substantially difficult to set individual functions.

Meanwhile, as disclosed in Japanese Unexamined Patent Application, First Publication No. 2005-096525, when an actuatable knee bolster has a structure in which a driving section is disposed outside a shock absorbing section, it is easy to set individual functions. However, a layout space occupied by the actuatable knee bolster in an instrument panel becomes increased.

As a result, the installation of the actuatable knee bolster may cause a disadvantageous effect on other functional components which may be deprived of the degree of freedom in design by the installation.

Also, an actuatable knee bolster is known which is provided in a lower portion on a portion of the instrument panel which is closer to a driver's seat, in which an opposing section is moved toward and away from an occupant seated in the driver's seat.

An actuatable knee bolster disclosed in Japanese Unexamined Patent Application, First Publication No. 2004-268713 has a rotational movement section that moves the opposing section toward and away from the occupant seated in the driver's seat by rotating the rotational movement section, in which the rotational movement section has the center of its rotational movement on a rear side of the vehicle.

As described above, since the center of the rotational movement of the rotational movement section is disposed on the rear side of the vehicle, the portion of the opposing section which is closer to the front side of the vehicle moves downward as the vehicle moves forward. As a result, the downward movement of the portion of the opposing section which is closer to the front side of the vehicle may decrease the space in which the driver's feet can freely move.

Also, an actuatable knee bolster is known which is provided in the instrument panel of a vehicle so as to be movable toward and away from an occupant by a driving of a motor.

An actuatable knee bolster disclosed in Japanese Unexamined Patent Application, First Publication No. 2005-297839 is configured so as to be movable between a standby position and an extending position. At the standby position, the actuatable knee bolster is retreated from the occupant and received in the instrument panel. At the extending position, the actuatable knee bolster reaches at the position which is closer to the occupant by extending (i.e., moving forward) toward the occupant.

In such an actuatable knee bolster that is configured to be movable between the standby position and the extending position, the forward movement of the actuatable knee bolster may be interrupted by an obstacle such as a baggage placed between the standby position and the extending position of the actuatable knee bolster. The interruption of the forward movement may increase the load applied to a motor. Thus, it is difficult to control the actuatable knee bolster in accordance with various situations.

SUMMARY OF THE INVENTION

The invention provides a compact actuatable knee bolster which can be installed in a small space of an instrument panel, thereby suppressing an effect on a degree of freedom in designing other functional components, securing a space in which the driver's feet can freely move, and enabling to control the actuatable knee bolster in accordance with various situations.

A first aspect of the invention provides an actuatable knee bolster that is provided in an instrument panel of a vehicle to protect lower legs of an occupant seated in a front seat of the vehicle, in which the actuatable knee bolster includes: an opposing section opposed to the lower legs of the occupant; a driving section driving the opposing section to move toward and away from the occupant; and a shock absorbing section configured to be plastically deformed when making contact with the lower legs of the occupant. In the actuatable knee bolster, the driving section is disposed inside the shock absorbing section.

According to the actuatable knee bolster, the driving section that drives the opposing section to move toward and away from the occupant is disposed inside the shock absorbing section. Therefore, the overall size of the actuatable knee bolster can be made compact. Moreover, it is not required to increase the layout space of the actuatable knee bolster in the instrument panel. Accordingly, it is possible to install the actuatable knee bolster in a small space.

Since it is possible to decrease the layout space in the instrument panel, it is possible to suppress an effect on a degree of freedom in designing other functional components.

In the actuatable knee bolster according to the first aspect of the invention, the shock absorbing section may include: a first surface section to which the driving section is connected; a second surface section disposed opposite to the first surface section in an input direction from the lower legs; a runout section formed in the second surface section so that the driving section is inserted in the runout section when the shock absorbing section is plastically deformed; and a curve section connecting the first surface section and the second surface section, thereby configuring the shock absorbing section in a substantially U-shape.

According to the actuatable knee bolster, when the shock absorbing section receives the load applied from the lower legs of the occupant to the opposing section via the driving section, the first surface section connected to the driving section is driven to move toward the second surface section opposite to the first surface section in the input direction from the lower legs.

At this moment, the curve section connecting the first surface section and the second surface section is bent to absorb the impact. In this case, the driving section coming closer to the second surface section together with the first surface section is inserted in the runout section formed in the second surface section. Accordingly, the driving section can move directly into the runout section.

Therefore, the shock absorbing section can be greatly deformed even when the actuatable knee bolster is realized in a compact configuration.

In the actuatable knee bolster according to the first aspect of the invention, the driving section may be connected to a portion separated from the curve section of the shock absorbing section.

According to the actuatable knee bolster the first aspect of the invention, the driving section is connected to a portion separated from the curve section in the first surface section of the shock absorbing section. Therefore, when the shock absorbing section receives the load applied from the lower legs of the occupant to the opposing section via the driving section, the curve section is efficiently bent by the first surface section. Accordingly, it is possible to absorb the impact in a more efficient manner.

In the actuatable knee bolster according to the first aspect of the invention, the shock absorbing section may be disposed on a portion which is adjacent to a driver's seat, and rotates about a first axis which is closer to a front side of the vehicle than the passenger.

In other words, the actuatable knee bolster according to the first aspect of the invention may be disposed on a portion which is closer to a driver's seat. The actuatable knee bolster may include an opposing section and a rotational movement section. The opposing section extends toward and retreats from an occupant. The rotational movement section rotates about the center of its rotational movement disposed on the front side of the vehicle.

Since the rotational movement section has the center of its rotational movement disposed on the front side of the vehicle, the portion of the opposing section which is closer to the rear side of the vehicle moves downward. Accordingly, it is possible to secure the space in which the driver's feet can freely move.

According to the actuatable knee bolster the first aspect of the invention, since the driver's feet are normally placed on a pedal, the leg of the driver is bent in an inverted V shape so that the angle made by the upper and lower parts of the leg decreases as the driver moves closer to the front side of the vehicle. In this case, since the joint portion of the upper and lower parts of the leg moves upward with the bending, it is possible to dispose the opposing section in a direction substantially perpendicular to the upward movement of the joint portion of the leg.

Accordingly, it is possible to absorb the impact energy in an efficient manner.

In the actuatable knee bolster according to the first aspect of the invention, the shock absorbing section may be disposed on a portion which is closer to a passenger seat, and rotates about a second axis which is closer to a rear side of the vehicle than the first axis.

In other words, the actuatable knee bolster according to the first aspect of the invention may be disposed on a portion which is closer to the passenger seat. The actuatable knee bolster may include an opposing section and a rotational movement section. The opposing section extends toward and retreats from an occupant. The rotational movement section rotates about the center of its rotational movement disposed on the rear side of the vehicle.

According to the actuatable knee bolster the first aspect of the invention, since the occupant's feet seated in the passenger seat are not normally placed on a pedal, the legs of the occupant are moved forward without being bent as the occupant moves toward the front side of the vehicle. In this case, since the center of the rotational movement is disposed on the rear side of the vehicle, it is possible to advantageously dispose the opposing section in a direction opposite to the moving direction of the legs.

Accordingly, it is possible to absorb the impact energy in an efficient manner.

Since the rotational movement section has the center of its rotational movement disposed on the rear side of the vehicle (i.e., in the vicinity of a boundary line of the rotational movement section and the instrument panel), the instrument panel and the rotational movement section in the absorbed state can be aligned relative to each other with a high precision. Accordingly, the overall exterior appearance is improved.

In the actuatable knee bolster according to the first aspect of the invention, the opposing section may be configured to extend toward and retreat from the instrument panel and be disposed on a portion of a column cover which is closer to the front side of the vehicle.

According to the actuatable knee bolster the first aspect of the invention, since the opposing section configured to extend toward and retreat from the instrument panel is disposed on the front side of the vehicle, the boundary line of the instrument panel and the rotational movement section in the absorbed state hidden from view by the presence of the column cover.

Accordingly, the overall exterior appearance is improved.

A second aspect of the invention provides an actuatable knee bolster that is provided in an instrument panel of a vehicle to protect lower legs of an occupant seated in a front seat of the vehicle, in which the actuatable knee bolster includes: an opposing section opposed to the lower legs of the occupant; a driving section driving the opposing section to move toward and away from the occupant by a driving force of a motor; a shock absorbing section configured to be plastically deformed when making contact with the lower legs of the occupant; and a rotation sensor configured to measure a rotation speed of the motor.

According to the actuatable knee bolster the second aspect of the invention, it is possible to detect a change in the speed of the opposing section moving toward and away from the occupant by the rotation sensor detecting the rotation speed of the motor.

Therefore, when the forward movement of the actuatable knee bolster is interrupted by an obstacle such as a baggage placed between the standby position and the extending position of the actuatable knee bolster and thus the speed of the opposing section moving toward and away from the occupant is decreased, the decrease in the speed of the opposing section can be detected by detecting the change in the rotation speed of the motor. Accordingly, it is possible to control the actuatable knee bolster in accordance with various situations.

In the actuatable knee bolster according to the second aspect of the invention, the actuatable knee bolster may further include a current measuring section configured to measure a current value of the motor.

According to the actuatable knee bolster the second aspect of the invention, it is possible to detect a change in the speed of the opposing section moving toward and away from the occupant by the current measuring section detecting the current value of the motor.

Therefore, when the forward movement of the actuatable knee bolster is interrupted by an obstacle such as a baggage placed between the standby position and the extending position of the actuatable knee bolster and thus the speed of the opposing section moving toward and away from the occupant is decreased, the decrease in the speed of the opposing section can be detected by detecting the change in the current value of the motor. Accordingly, it is possible to control the actuatable knee bolster in accordance with various situations in a secured manner.

In the actuatable knee bolster according to the second aspect of the invention, the actuatable knee bolster may further include: a current measuring section configured to measure a current value of the motor; and a control section controlling the motor on the basis of the detection result obtained from at least one of the rotation sensor and the current measuring section.

According to the actuatable knee bolster the second aspect of the invention, since the motor is controlled on the basis of the detection result obtained from at least one of the rotation sensor and the current measuring section, it is possible to control the actuatable knee bolster in accordance with various situations with a simple configuration while maintaining a high reliability.

BRIEF DESCRIPTION OF THE DRAWINGS

FIG. 18 is a timing chart showing another example of the operation of the actuatable knee bolster of the seventh embodiment of the invention.

DETAILED DESCRIPTION OF THE INVENTION

Now, exemplary embodiments of the invention will be described with reference to the attached drawings.

First Embodiment

Hereinafter, an actuatable knee bolster in accordance with a first embodiment of the will be described with reference to FIGS. 1 and 2.

Figure 1:
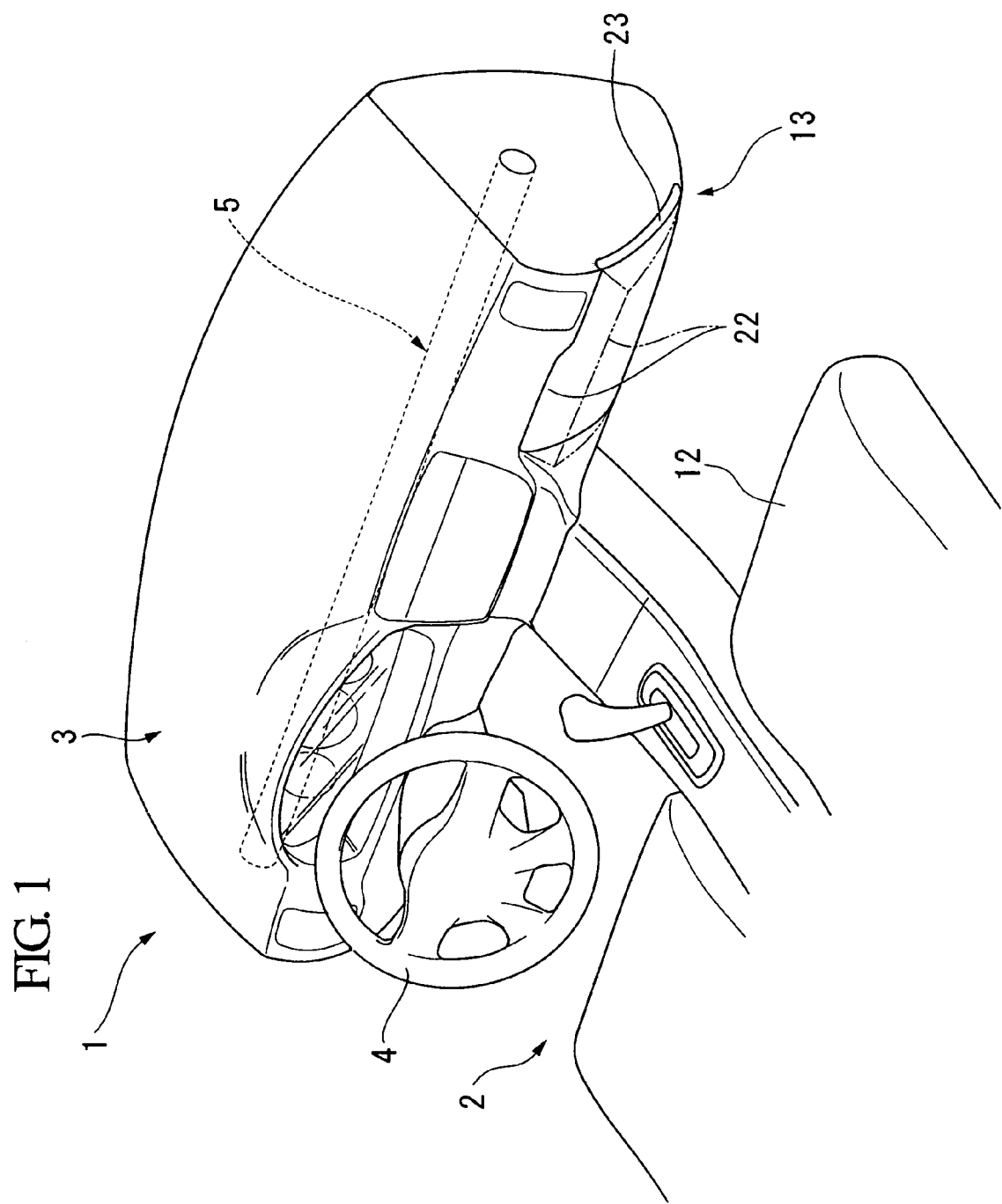
FIG. 1 is a perspective view of a front portion of an interior of a vehicle including an actuatable knee bolster of a first embodiment of the invention.

FIG. 1 is a perspective view of a front portion of an interior 2 of a vehicle 1, in which an instrument panel 3 is provided on the front portion of the vehicle interior 2.

In the instrument panel 3, a steering support member 5 that supports a steering shaft (not shown) connected to a steering wheel 4 is disposed along the vehicle-width direction.

Both ends of the steering support member 5 are fixed to left and right-side front pillars (not shown) that is a frame member of the vehicle's body.

The steering support member 5 is made of a cylindrical steel material having a high stiffness, and has a function of increasing the stiffness of the vehicle body by being connected to the left and right-side front pillars.

The actuatable knee bolster 13 of the first embodiment is provided on a passenger seat portion (front seat, front-side passenger seat) 12 of the instrument panel 3 so as to protect the lower legs of an occupant seated in the passenger seat 12 in the event of a vehicle collision.

The actuatable knee bolster 13 is configured to move an opposing section 22 constituting a decoration surface of the vehicle interior 2. The opposing section 22 is disposed opposite to the lower legs of the occupant seated in the passenger seat 12. The actuatable knee bolster 13 allows the opposing section 22 to be extended toward and away from the lower legs of the occupant.

In FIG. 1, the state in which the opposing section 22 moves away from the occupant is shown with the solid line, and the state in which the opposing section moves toward the occupant is shown with the dashed and two-dotted line.

Figure 2:
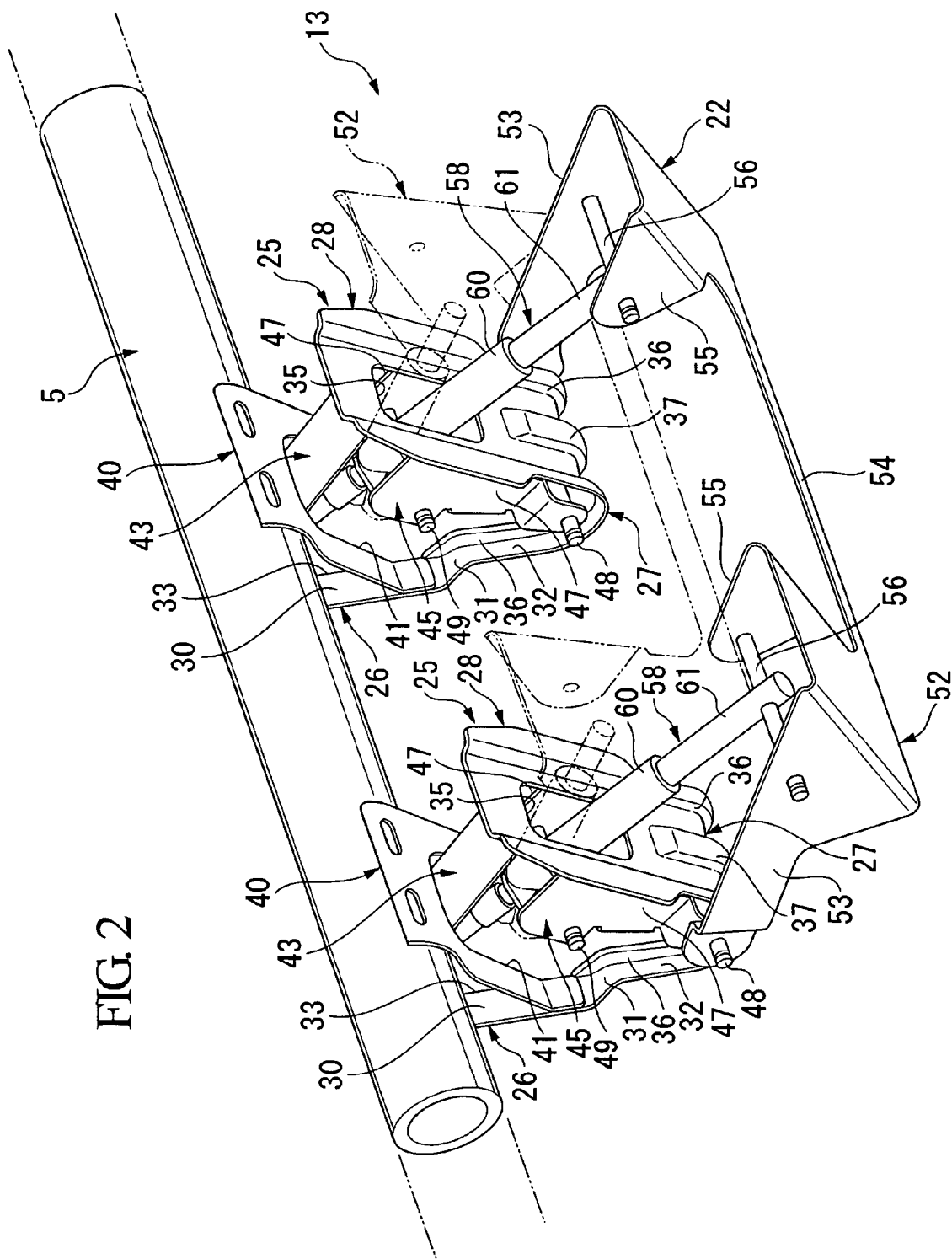
FIG. 2 is a perspective view of a configuration of the actuatable knee bolster of the first embodiment of the invention.

FIG. 2 is a perspective view of a configuration of mechanical components excluding a cover 23 shown in FIG. 1. The cover 23 has the opposing section 22 constituting the decoration surface of the actuatable knee bolster 13.

The actuatable knee bolster 13 includes a plurality of, specifically a pair of, shock absorbing members (shock absorbing sections) 25 that are fixed to the steering support member 5 with a predetermined gap between the members in the vehicle-width direction.

The shock absorbing members 25 are press-molded with a plate-shaped steel material.

Each of the shock absorbing members 25 includes a surface section (the second surface section) 26, a curvature section (curve section) 27, and a surface section (the first surface section) 28. Each of the shock absorbing members 25 has a substantially U shape when viewed from a side view (i.e., the curvature section 27 connects the surface sections 26 and 28 to each other).

The surface section 26 has an entirely flat shape that is fixed to the rear side (when viewed by the occupant) of the steering support member 5 and extends downward. The curvature section 7 is bent from the lower edge portion of the surface section 26 and is folded back toward the inside of the vehicle interior. The surface section 28 has an entirely flat shape that extends upward from the edge portion of the curvature section 27 opposite to the surface section 26.

The surface section 26 includes an upper plate section 30, a step plate section 31, and a lower plate section 32.

The upper plate section 30 has its upper end portion fixed to the steering support member 5 and extends downward from the steering support member 5. The step plate section 31 is bent from the lower edge portion of the upper plate section 30 and extends slightly toward the inside of the vehicle interior. The lower plate section 32 is bent from the edge portion on the vehicle interior side of the step plate section 31 and extends downward. The lower edge portion of the lower plate section 32 is connected to the curvature section 27.

In the surface section 26, a notch-shaped runout section 33 opened upward is formed in the central portion of the surface section 26 in the vehicle-width direction and extends over the upper plate section 30, the step plate section 31, and the lower plate section 32.

A hole section 35 is formed in the upper central portion of the surface section 28 in the vehicle-width direction.

In the shock absorbing member 25, a pair of stepped bead sections 36 is formed to increase the stiffness of the shock absorbing member 25. The stepped bead sections 36 extend from the portion of the surface section 26 which is closer to the runout section 33 of the step plate section 31, to the lower plate section 32, the curvature section 27, and the surface section 28, without changing their positions in the vehicle-width direction.

Moreover, on the curvature section 27 and the surface section 28, an embossed bead section 37 is formed between the bead sections 36 to increase the stiffness of the sections 27 and 28, and extends near the hole section 35.

The actuatable knee bolster 13 includes a pair of connection members 40. At the connection members 40, the actuatable knee bolster 13 is fixed to the attachment positions of the shock absorbing member 25 of the steering support member 5 on the vehicle interior side.

The connection members 40 also extend downward so as to be fixed to the corresponding shock absorbing member 25.

The connection members 40 are press-molded with a plate-shaped steel material. The connection members 40 are fixed to the portion of the upper plate section 30 which is closer to the step plate section 31 of the shock absorbing members 25 corresponding to the connection members 40, respectively.

In each of the connection members 40, a notch section 41 opened downward is formed in the central portion of the connection member 40 in the vehicle-width direction in a state in which the position in the vehicle-width direction is aligned with the runout section 33 of the corresponding shock absorbing member 25, and has a substantially inverted C shape when viewed from a front view.

The actuatable knee bolster 13 also includes a pair of connection members 43 which are press-molded with a plate-shaped steel material. The connection members 43 are fixed to the lower surface of the steering support member 5 corresponding to the attachment positions of the steering support member 5 and the shock absorbing members 25. The connection members 43 extend toward the inside of the vehicle interior so as to be fixed to a portion above the hole section 35 in the surface section 28 of the corresponding shock absorbing member 25.

In each of the shock absorbing members 25, a supporting section 45 is disposed between the surface sections 26 and 28, the supporting section 45 being fixed to the surface section 28.

The supporting section 45 is press-molded with a plate-shaped steel material.

The supporting section 45 includes a bottom plate section (not shown) and a pair of wall plate sections 47. The bottom plate section is fixed to a portion of the surface section 28 disposed closer to the curvature section 27 than the hole section 35. The pair of wall plate sections 47 extends from both sides in the vehicle-width direction of the bottom plate section. On a portion of the wall plate sections 47 which is closer to the curvature section 27, a rotational movement shaft 48 is installed along the vehicle-width direction.

The wall plate sections 47 extend from the bottom plate section toward the opposite side of the curvature section 27 so that the wall plate sections 47 are disposed on both sides of the hole section 35 of the surface section 28. On each of the extending portions of the wall plate sections 47, a rotational movement shaft 49 is installed along the vehicle-width direction.

The rotational movement shaft 49 is disposed at a position separated from the curvature section 27.

A retaining member 52 for retaining the cover 23 shown in FIG. 1 is rotatably supported on the rotational movement shafts 48 of the supporting sections 45.

The retaining member 52 is press-molded with a plate-shaped steel material. The retaining member 52 includes a pair of extension plate sections 53, a connecting plate section 54, and a pair of opposing plate sections 55.

At the outside of the retaining member 52, the pair of extension plate sections 53 is supported by both ends of the rotational movement shafts 48, respectively. The pair of extension plate sections 53 extends from the ends of the rotational movement shafts 48 toward the inside of the vehicle interior. The connecting plate section 54 connects the distal ends of the extension plate sections 53 to each other. The pair of opposing plate sections 55 extends from the connecting plate section 54 toward the outside of the vehicle interior so as to be disposed opposite to the extension plate sections 53.

On a first extension plate section 53 and a first opposing plate section 55 on a first portion in the vehicle-width direction, a first rotational movement shaft 56 is installed along the vehicle-width direction. On a second extension plate section 53 and a second opposing plate section 55 on a second portion in the vehicle-width direction, a second rotational movement shaft 56 is installed along the vehicle-width direction.

A first driving section 58 is disposed so as to connect the rotational movement shaft 56 of the retaining member 52 and the rotational movement shaft 49 of the supporting section 45 on a first portion in the vehicle-width direction. Similarly, a second driving section 58 is disposed so as to connect the rotational movement shaft 56 of the retaining member 52 and the rotational movement shaft 49 of the supporting section 45 on a second portion in the vehicle-width direction.

In this case, each of the driving sections 58 extends from the rotational movement shaft 56 disposed outside the shock absorbing member 25 on the installation side of the driving section to the rotational movement shaft 49 disposed inside the shock absorbing member 25 while passing through the hole section 35 of the surface section 28 and being inserted into the inside of the shock absorbing member 25.

That is, each of the driving sections 58 is provided such that a portion of the driving section is disposed inside the shock absorbing member 25.

Each of the driving sections 58 is configured as a rigid body having a cylinder 60 and a shaft 61 disposed in the cylinder 60 so as to extend toward and retreat from the cylinder 60 by an electric motor (not shown). The driving section 58 is freely expandable and contractible as a whole.

In the driving section 58, the cylinder 60 is rotatably connected to the rotational movement shaft 49 on the portion which is closer to the shock absorbing member 25, and the shaft 61 is rotatably connected to the rotational movement shaft 56 of the retaining member 52. By the shaft 61 moving toward and away from the cylinder 60, the retaining member 52, i.e., the opposing section 22 is caused to rotate and is moved toward and away from the occupant.

Specifically, when the driving section 58 is in the contracted state in which the shaft 61 is retracted to the maximum extent, the retaining member 52 is positioned outside the vehicle interior. At this moment, the opposing section 22 constituted by the retaining member 52 and the cover 23 fixed to the retaining member 52 are positioned in such a way that the retaining member 52 is farthest away from the occupant, as denoted by the solid line in FIG. 1 and the two-dotted line in FIG. 2.

Meanwhile, when the driving section 58 is in the expanded state in which the shaft 61 is extended to the maximum extent, the retaining member 52 is positioned inside the vehicle interior. At this moment, the opposing section 22 is positioned in such a way that the opposing section 22 is closest to the occupant, as denoted by the two-dotted line in FIG. 1 and the solid line in FIG. 2.

The driving sections 58 are driven in a synchronized manner.

In such an actuatable knee bolster 13, the actuatable knee bolster 13 is in a standby position when the opposing section 22 is farthest away from the occupant. For example, when a seat sensor (not shown) installed in the passenger seat 12 detects that the occupant is seated in the passenger seat 12, the actuatable knee bolster 13 moves the opposing section 22 toward the occupant.

Accordingly, the lower legs of the occupant are supported by the opposing section 22 at the time of a vehicle collision.

In this case, the driving section 58 may oscillate, but the hole section 35, the runout section 33, and the notch section 41 are sized to allow the oscillation.

When the opposing section 22 receives a load from the occupant at the time of the vehicle collision, the opposing section 22 presses the driving section 58 having the first end thereof connected to the rotational movement shaft 56. As a result, the load is applied to the supporting section 45 backing the rotational movement shaft 49 connected to the second end of the driving section 58. Thus, the surface section 28 on the vehicle interior side of the shock absorbing member 25 fixed to the supporting section 45 receives the load in a direction toward the outside of the vehicle interior.

When the load exceeds a predetermined value, the surface section 28 of the shock absorbing member 25 which is closer to the vehicle interior and which is connected to the driving section 58 is driven to move toward the surface section 26 disposed outside the vehicle interior opposite in the input direction from the lower legs, i.e., in the inside-outside direction of the vehicle interior. The curvature section 27 connecting the surface sections 26 and 28 to each other and the connection member 43 are plastically deformed and bent to absorb the impact (in other words, the shock absorbing member 25 is plastically deformed when the opposing section 22 makes contact with the lower legs of the occupant).

At this moment, the driving section 58 coming closer to the surface section 26 disposed outside the vehicle interior together with the surface section 28 on the vehicle interior side is inserted in the runout section 33 formed in the surface section 26 disposed outside the vehicle interior. Accordingly, the driving section 58 can move directly into the runout section 33 without making contact with the surface section 26 (in other words, the runout section 33 is formed in the surface section 26 so that the driving section 58 is inserted in the runout section 33 at the time of the plastic deformation of the shock absorbing section 25).

According to the actuatable knee bolster 13 of the first embodiment described above, the driving section 58 that drives the opposing section 22 to move toward and away from the occupant is disposed inside the shock absorbing section 25. Therefore, the overall size of the actuatable knee bolster 13 can be made compact. Moreover, it is not required to increase the layout space of the actuatable knee bolster 13 in the instrument panel 3. Accordingly, it is possible to install the actuatable knee bolster 13 in a small space.

Since it is possible to decrease the layout space in the instrument panel 3, it is possible to suppress an effect on the degree of freedom in designing other functional components.

When the shock absorbing section 25 receives the load applied from the lower legs of the occupant to the opposing section 22 via the driving section 58, the first surface section 28 connected to the driving section 58 is driven to move toward the second surface section 26 opposite to the first surface section 28 in the input direction from the lower legs. At this moment, the curvature section 27 connecting the surface sections 26 and 28 to each other is bent to absorb the impact. In this case, the driving section 58 coming closer to the second surface section 26 together with the first surface section 28 is inserted in the runout section 33 formed in the second surface section 26. Accordingly, the driving section 58 can move directly into the runout section 33.

Therefore, the shock absorbing section 25 can be greatly deformed even when the actuatable knee bolster is realized in a compact configuration.

The driving section 58 is connected to a portion separated from the curvature section 27 in the first surface section 28 of the shock absorbing section 25. Therefore, when the shock absorbing section 25 receives the load applied from the lower legs of the occupant to the opposing section 22 via the driving section 58, the curvature section 27 is efficiently bent by the first surface section 28. Accordingly, it is possible to absorb the impact in a more efficient manner.

The runout section 33 allowing the driving section 58 to be inserted therein at the time of the plastic deformation of the shock absorbing section 25 may be formed as a hole rather than a notch.

Second Embodiment

Hereinafter, an actuatable knee bolster in accordance with a second embodiment of the invention will be described with reference to FIG. 3, with a focus on parts different from those of the first embodiment.

Those parts identical to the first embodiment will be denoted by the same reference numerals, and descriptions thereof will be omitted.

The actuatable knee bolster 113 of the second embodiment includes a plurality of, specifically a pair of, shock absorbing members (shock absorbing sections) 75 that are fixed to the steering support member 5 with a predetermined gap between the members in the vehicle-width direction.

The shock absorbing members 75 are press-molded with a plate-shaped steel material. Each of the shock absorbing members 75 includes a surface section (the second surface section) 76 having an entirely flat shape that is fixed to the front side (when viewed by the occupant) of the steering support member 5 and extends toward the inside of the vehicle interior (i.e., toward the occupant), a curvature section (curved section) 77 that is bent from the edge portion on the vehicle interior side of the surface section 76 and is folded back toward the outside of the vehicle interior, and a surface section (the first surface section) 78 having an entirely flat shape that extends toward the outside of the vehicle interior from the edge portion of the curvature section 77 opposite to the surface section 76. Each of the shock absorbing members 75 has a substantially U shape when viewed from a side view (i.e., the curvature section 77 connects the surface sections 76 and 78 to each other).

A hole-shaped runout section 80 is formed at a portion of the surface section 76 which is closer to the curvature section 77 and in the central portion of surface section 76 in the vehicle-width direction.

A notch section 81 opened at the outside of the vehicle interior is formed in the central portion of the surface section 78 in the vehicle-width direction disposed opposite to the curvature section 77.

In the shock absorbing member 75, an embossed bead section 82 is formed in the central portion of the shock absorbing member 75 in the vehicle-width direction so as to increase the stiffness of the shock absorbing member 75, and extend from a portion of the surface section 76 which is disposed closer to the outside of the vehicle interior than the runout section 80 to the curvature section 77 and the surface section 78.

The actuatable knee bolster 113 includes a pair of connection members 85 that are fixed to the steering support member 5 on the lower side corresponding to the attachment positions of the steering support member 5 and the shock absorbing members 75. The connection members 85 extend toward the inside of the vehicle interior so as to be fixed to the corresponding shock absorbing member 75.

The connection members 85 are press-molded with a plate-shaped steel material, and are fixed to a portion of the surface section 76 of the corresponding shock absorbing members 75 disposed closer to the outside of the vehicle interior than the runout section 80.

In each of the connection members 85, a notch section 86 opened at the inside of the vehicle interior is formed in the central portion of the connection member 86 in the vehicle-width direction. The notch section 86 has a substantially inverted C shape when viewed from a plan view.

The actuatable knee bolster 113 also includes a pair of connection members 88 which are fixed to the surface section 76 on the upper side of each of the shock absorbing members 75 and to the surface section 78 on the lower side of each of the shock absorbing members 75, while passing through the notch section 86 of the connection member 85 and extending downward.

The connection members 88 are also press-molded with a plate-shaped steel material. The connection members 88 are shaped such that the widths thereof increase as they go downward. A notch section 89 opened downward is formed in the central portion of the connection member 88 in the vehicle-width direction. The connection member has a substantially inverted Y shape when viewed from the front view.

In each of the shock absorbing members 75, a supporting section 91 is fixed to the top surface of the surface section 78 on the lower side of the shock absorbing member 75, and the supporting section 91 is press-molded with a plate-shaped steel material.

The supporting section 91 includes an intermediate plate section 92 extending in the vehicle-width direction from a portion of the surface section 78 which is closer to the curvature section 77, a pair of wall plate sections 93 bent from both sides in the vehicle-width direction of the intermediate plate section 92 and extending toward the outside of the vehicle interior, a pair of bottom plate sections 94 (only a single section is shown in the drawing) extending away from the lower edge portions of the wall plate sections 93 and fixed to a portion of the surface section 78 disposed closer to the curvature section 77 than the notch section 81, and a pair of backing plate sections 95 bend downward from both edge portions in the vehicle-width direction of the bottom plate section 94 and extending toward the inside of the vehicle interior.

On the wall plate sections 93, a first rotational movement shaft 96 is installed along the vehicle-width direction. On the backing plate sections 95, a second rotational movement shaft 97 is installed along the vehicle-width direction.

A retaining member 100 for retaining the cover (not shown in FIG. 3) including the opposing section 22 constituting the decoration surface is rotatably supported on the rotational movement shafts 97 of the supporting sections 91.

The retaining member 100 is press-molded with a plate-shaped steel material. The retaining member 100 includes two pairs of extension plate sections 101 connected to respective ends of the rotational movement shafts 97 and extending toward the inside of the vehicle interior, a main plate section 102 connecting the respective distal ends of the extension plate sections 101 to each other and extending toward the outside of the vehicle interior, and two pairs of backing plate sections 103 extending upward from a portion of the main plate section 102 disposed outside the vehicle interior.

On the pair of backing plate sections 103 on a first portion in the vehicle-width direction, a first rotational movement shaft 104 is installed along the vehicle-width direction. On the pair of backing plate sections 103 on a second portion in the vehicle-width direction, a second rotational movement shaft 104 (although not shown in the drawing) is installed along the vehicle-width direction.

A first driving section 108 is disposed so as to connect the rotational movement shaft 104 of the retaining member 100 and the rotational movement shaft 96 of the supporting section 91 on a first portion in the vehicle-width direction. Similarly, a second driving section 108 is disposed so as to connect the rotational movement shaft 104 of the retaining member 100 and the rotational movement shaft 96 of the supporting section 91 on the second portion in the vehicle-width direction.

In this case, each of the driving sections 108 extends from the rotational movement shaft 104 disposed outside the corresponding shock absorbing member 75 to the rotational movement shaft 96 disposed inside the shock absorbing member 75 while passing through the notch section 81 of the surface section 78 and being inserted into the inside of the shock absorbing member 75.

That is, each of the driving sections 108 is provided such that a portion of the driving section 108 is disposed inside the shock absorbing member 75.

Each of the driving sections 108 is configured as a rigid body having a cylinder 110 and a shaft 111 disposed in the cylinder 110 so as to extend toward and retreat from the cylinder 110 by an electric motor (not shown). The driving section 108 is freely expandable and contractible as a whole.

In the driving section 108, the cylinder 110 is rotatably connected to the rotational movement shaft 96 which is closer to the shock absorbing member 75, and the shaft 111 is rotatably connected to the rotational movement shaft 104 of the retaining member 100. By the shaft 111 moving toward and away from the cylinder 110, the retaining member 100 is caused to rotate and is moved toward and away from the occupant.

Figure 3:
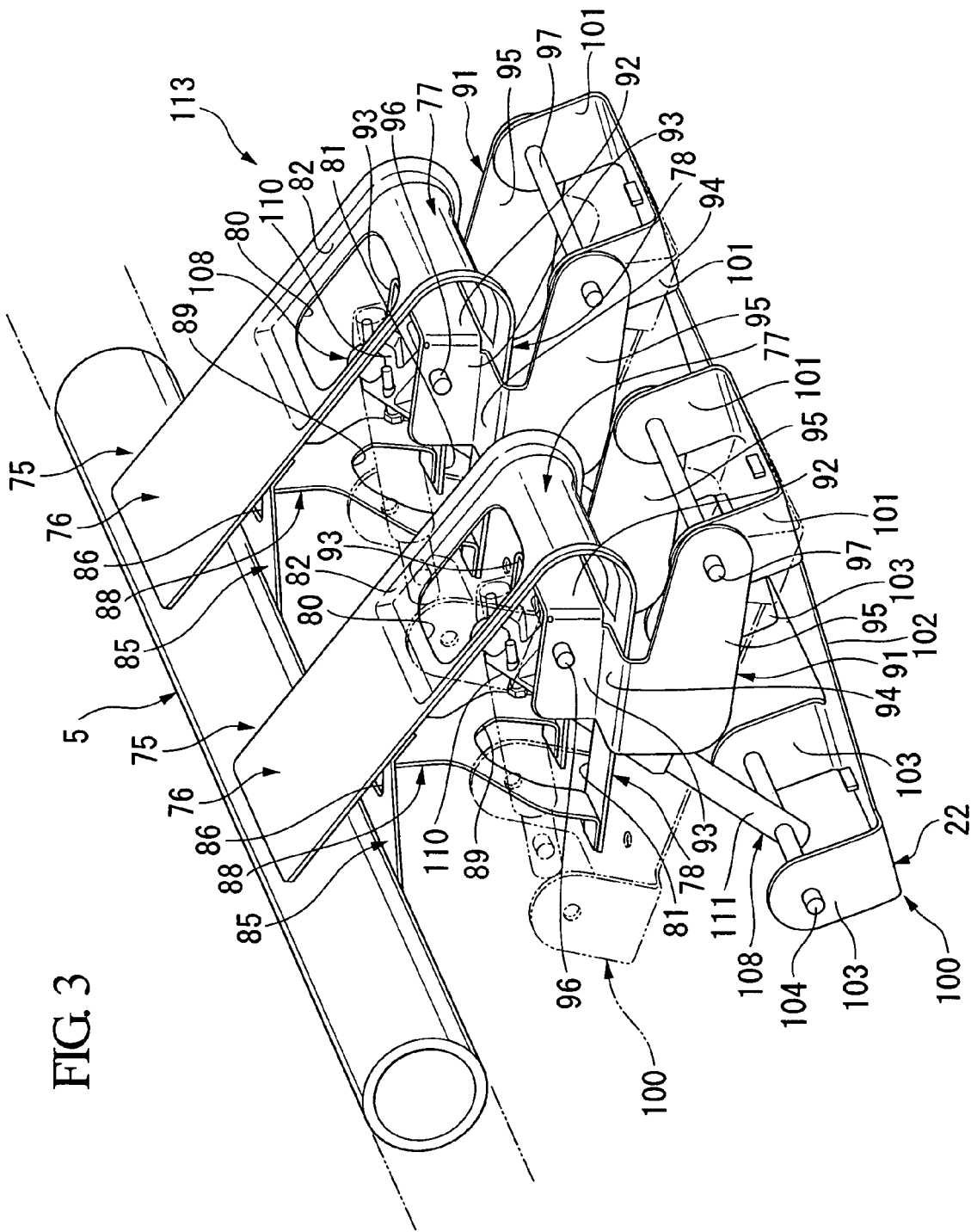
FIG. 3 is a perspective view of a configuration of the actuatable knee bolster of a second embodiment of the invention.

Specifically, when the driving section 108 is in the contracted state in which the shaft 111 is retracted to the maximum extent, the retaining member 100 is positioned outside the vehicle interior, as denoted by the two-dotted line in FIG. 3. At this moment, the retaining member 100 is positioned in such a way that the retaining member 100 is farthest away from the occupant.

Meanwhile, when the driving section 108 is in the expanded state in which the shaft 111 is extended to the maximum extent, the retaining member 100 is positioned inside the vehicle interior, as denoted by the solid line in FIG. 3. At this moment, the retaining member 100 is positioned in such a way that the retaining member 100 is closest to the occupant.

The driving sections 108 are driven in a synchronized manner.

In such an actuatable knee bolster 113 of the second embodiment, the actuatable knee bolster 113 is in a standby position when the retaining member 100 is farthest away from the occupant. For example, when a seat sensor (not shown) installed in the passenger seat 12 detects that the occupant is seated in the passenger seat 12, the actuatable knee bolster 113 moves the retaining member 100 toward the occupant.

In this case, the driving section 108 may oscillate, but the notch section 81 of the shock absorbing member 75 and the notch section 89 of the connection member 88 are sized to allow the oscillation.

When the retaining member 100 receives a load from the occupant at the time of the vehicle collision, the retaining member 100 presses the driving section 108 having the first end thereof connected to the rotational movement shaft 104. As a result, the load is applied to the supporting section 91 backing the rotational movement shaft 96 connected to the second end of the driving section 108. Thus, the surface section 78 on the lower side of the shock absorbing member 75 fixed to the supporting section 91 receives the load in such a direction that the front portion of the surface section 78 is raised.

When the load exceeds a predetermined value, the surface section 78 of the shock absorbing member 75 connected to the driving section 108 is driven to move toward the surface section 76 disposed on the upper side of the shock absorbing member 75 opposite in the input direction from the lower legs, i.e., in such a direction that the front portion thereof is raised. The curvature section 77 connecting the surface sections 76 and 78 to each other and the connection member 88 are plastically deformed and bent to absorb the impact (in other words, the shock absorbing member 75 is plastically deformed when the opposing section 22 makes contact with the lower legs of the occupant).

At this moment, the driving section 108 coming closer to the surface section 76 disposed on the upper side together with the surface section 78 disposed on the lower side is inserted in the runout section 80 formed in the surface section 76 disposed on the upper side. Accordingly, the driving section 108 can move directly into the runout section 80 without making contact with the surface section 76 (in other words, the runout section 80 is formed in the surface section 76 so that the driving section 108 is inserted in the runout section 80 at the time of the plastic deformation of the shock absorbing section 75).

According to the actuatable knee bolster 113 of the second embodiment described above, the driving section 108 is disposed inside the shock absorbing section 75. Therefore, the overall size of the actuatable knee bolster 113 can be made compact in a similar manner to the case of the first embodiment.

When the shock absorbing section 75 receives the load applied from the lower legs of the occupant to the retaining member 100 via the driving section 108, the first surface section 78 connected to the driving section 108 is driven to move toward the second surface section 76 opposite to the first surface section 78 in the input direction from the lower legs. At this moment, the curvature section 77 connecting the surface sections 76 and 78 to each other is bent to absorb the impact. In this case, the driving section 108 coming closer to the second surface section 76 together with the first surface section 78 is inserted in the runout section 80 formed in the second surface section 76. Accordingly, the driving section 108 can move directly into the runout section 80.

Therefore, the shock absorbing section 75 can be greatly deformed even when the actuatable knee bolster is realized in a compact configuration.

The driving section 108 is connected to a portion separated from the curvature section 77 in the first surface section 78 of the shock absorbing section 75. Therefore, when the shock absorbing section 75 receives the load applied from the lower legs of the occupant via the driving section 108, the curvature section 77 is efficiently bent by the first surface section 78. Accordingly, it is possible to absorb the impact in a more efficient manner.

The runout section 80 allowing the driving section 108 to be inserted therein at the time of the plastic deformation of the shock absorbing section 75 may be formed as a notch rather than a hole.

Third Embodiment

Hereinafter, an actuatable knee bolster in accordance with a third embodiment of the invention will be described with reference to FIGS. 4 to 7.

Figure 4:
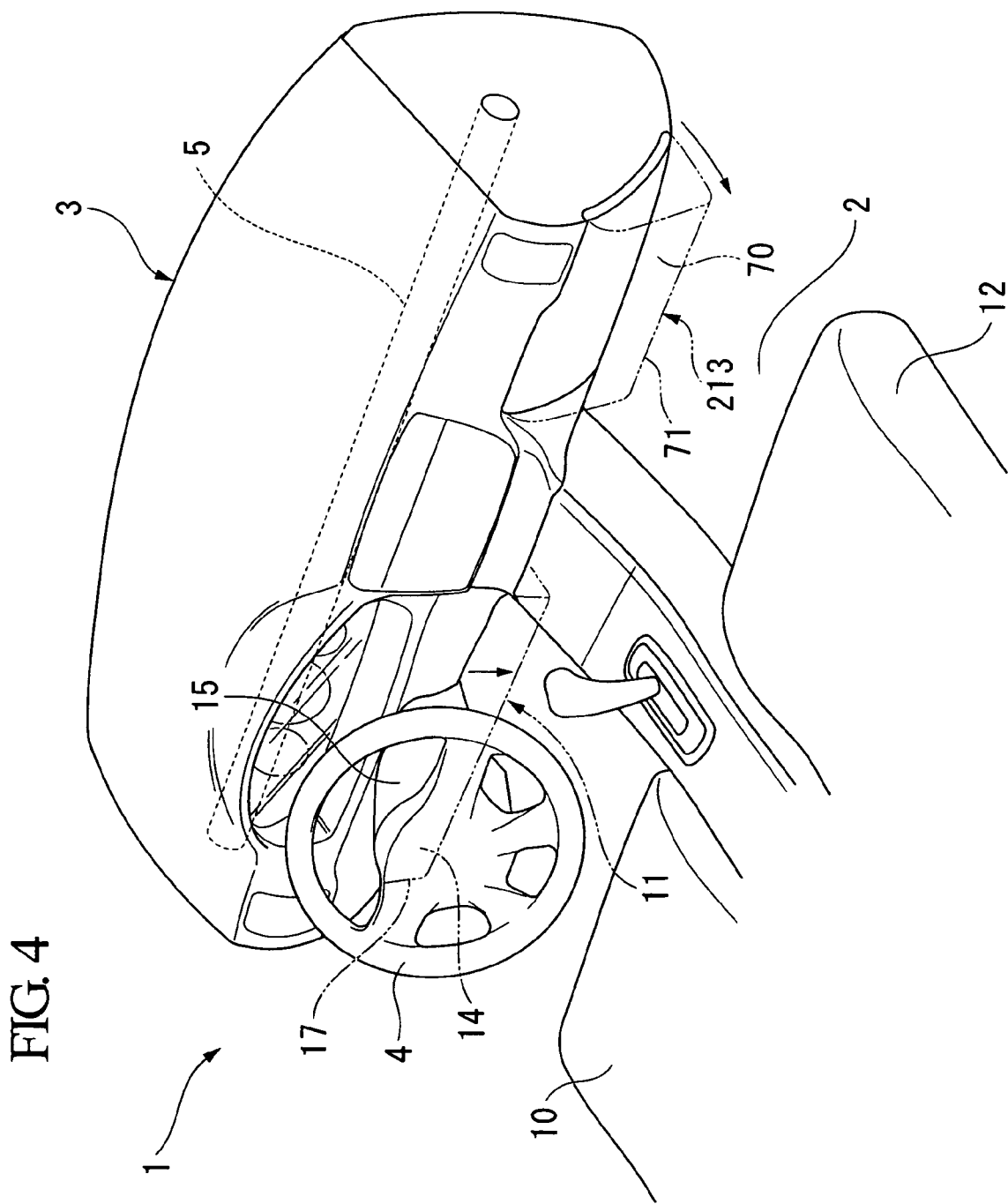
FIG. 4 is a perspective view of a front portion of an interior of a vehicle including an actuatable knee bolster of a third embodiment and a fourth embodiment of the invention.

FIG. 4 is a perspective view of a front portion of an interior 2 of a vehicle 1, in which an instrument panel 3 is provided on the front portion of the vehicle interior 2.

In the instrument panel 3, a steering support member 5 that supports a steering shaft (not shown) connected to a steering wheel 4 is disposed along the vehicle-width direction. Both ends of the steering support member 5 are fixed to left and right-side front pillars (not shown) that is a frame member of the vehicle's body.

The steering support member 5 is made of a cylindrical steel material having a high stiffness, and has a function of increasing the stiffness of the vehicle body by being connected to the left and right-side front pillars.

The actuatable knee bolster 11 of the third embodiment is provided on the left side (i.e., on the driver's seat 10) of the steering support member 5. Meanwhile, the actuatable knee bolster 213 of the fourth embodiment to be described later is provided on the right side (i.e., on the passenger seat 12) of the steering support member 5.

As shown in FIG. 4, the actuatable knee bolster 11 of the third embodiment is provided on the lower portion on the driver's seat 10 of the instrument panel 3 so as to protect the lower legs of a driver seated in the driver's seat 10.

The actuatable knee bolster 11 is configured to move an opposing section 14 constituting a decoration surface of the vehicle interior 2. The opposing section 14 is disposed opposite to the lower legs of the driver seated in the driver's seat 10. The actuatable knee bolster 11 allows the opposing section 14 to extend toward and retreat from the instrument panel 3. Thereby, the opposing section 14 is extended toward and away from the lower legs of the driver in a reversible manner.

In the instrument panel 3, a column cover 15 extending toward the rear side of the vehicle is provided above the actuatable knee bolster 11, and a steering wheel 4 is provided on the portion of the column cover 15 which is closer to the rear side of the vehicle.

Meanwhile, the opposing section 14 is disposed on the portion of the column cover 15 which is closer to the front side of the vehicle.

Figure 6:
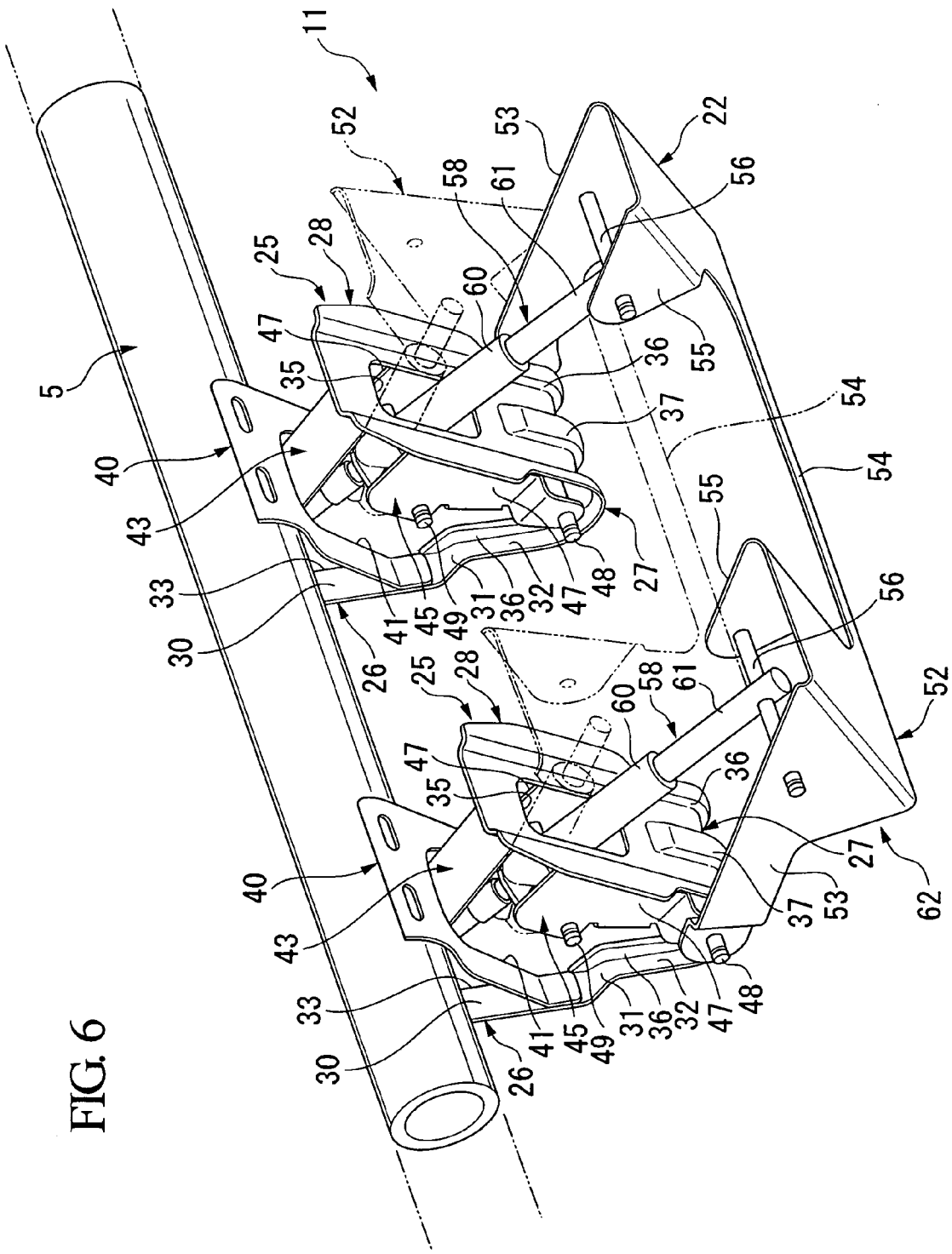
FIG. 6 is a perspective view of a configuration of the actuatable knee bolster of the third embodiment of the invention.

FIG. 6 is a perspective view of a configuration of mechanical components excluding a cover 17 shown in FIG. 1. The cover 17 has the opposing section 14 constituting the decoration surface of the actuatable knee bolster 11.

The actuatable knee bolster 11 includes a plurality of, specifically a pair of, shock absorbing members 25 that are fixed to the steering support member 5 with a predetermined gap between the members in the vehicle-width direction.

The shock absorbing members 25 are press-molded with a plate-shaped steel material. Each of the shock absorbing members 25 includes a surface section 26, a curvature section (curve section) 27, and a surface section (the first surface section) 28. Each of the shock absorbing members 25 has a substantially U shape when viewed from a side view.

The surface section 26 has an entirely flat shape that is fixed to the rear side (when viewed by the driver) of the steering support member 5 and extends downward. The curvature section 27 is bent from the lower edge portion of the surface section 26 and is folded back toward the inside of the vehicle interior. The surface section 28 has an entirely flat shape that extends upward from the edge portion of the curvature section 27 opposite to the surface section 26.

The surface section 26 includes an upper plate section 30, a step plate section 31, and a lower plate section 32.

The upper plate section 30 has its upper end portion fixed to the steering support member 5 and extends downward from the steering support member 5. The step plate section 31 is bent from the lower edge portion of the upper plate section 30 and extends slightly toward the inside of the vehicle interior. The lower plate section 32 is bent from the edge portion on the vehicle interior side of the step plate section 31 and extends downward. The lower edge portion of the lower plate section 32 is connected to the curvature section 27.

In the surface section 26, a notch-shaped runout section 33 opened upward is formed in the central portion of the surface section 26 in the vehicle-width direction and extends over the upper plate section 30, the step plate section 31, and the lower plate section 32.

A hole section 35 is formed in the upper central portion of the surface section 28 in the vehicle-width direction.

In the shock absorbing member 25, a pair of stepped bead sections 36 is formed to increase the stiffness of the shock absorbing member 25. The stepped bead sections 36 extend from the portion of the surface section 26 which is closer to the runout section 33 of the step plate section 31, to the lower plate section 32, the curvature section 27, and the surface section 28, without changing their positions in the vehicle-width direction.

Moreover, on the curvature section 27 and the surface section 28, an embossed bead section 37 is formed between the bead sections 36 to increase the stiffness of the sections 27 and 28, and extends near the hole section 35.

The actuatable knee bolster 11 includes a pair of connection members 40. At the connection members 40, the actuatable knee bolster 11 is fixed to the attachment positions of the shock absorbing members 25 of the steering support member 5 on the vehicle interior side.

The connection members 40 also extend downward so as to be fixed to the corresponding shock absorbing member 25.

The connection members 40 are press-molded with a plate-shaped steel material. The connection members 40 are fixed to the portion of the upper plate section 30 which is closer to the step plate section 31 of the shock absorbing members 25 corresponding to the connection members 40, respectively.

In each of the connection members 40, a notch section 41 opened downward is formed in the central portion of the connection member 40 in the vehicle-width direction in a state in which the position in the vehicle-width direction is aligned with the runout section 33 of the corresponding shock absorbing member 25, and has a substantially inverted C shape when viewed from a front view.

The actuatable knee bolster 11 also includes a pair of connection members 43 which are press-molded with a plate-shaped steel material. The connection members 43 are fixed to the lower surface of the steering support member 5 corresponding to the attachment positions of the steering support member 5 and the shock absorbing members 25. The connection members 43 extend toward the inside of the vehicle interior so as to be fixed to a portion above the hole section 35 in the surface section 28 of the corresponding shock absorbing member 25.

In each of the shock absorbing members 25, a supporting section 45 is disposed between the surface sections 26 and 28, the supporting section 45 being fixed to the surface section 28.

The supporting section 45 is press-molded with a plate-shaped steel material.

The supporting section 45 includes a bottom plate section (not shown) and a pair of wall plate sections 47. The bottom plate section is fixed to a portion of the surface section 28 disposed closer to the curvature section 27 than the hole section 35. The pair of wall plate sections 47 extends from both sides in the vehicle-width direction of the bottom plate section. On a portion of the wall plate sections 47 which is closer to the curvature section 27, a rotational movement shaft 48 is installed along the vehicle-width direction.

The wall plate sections 47 extend from the bottom plate section toward the opposite side of the curvature section 27 so that the wall plate sections 47 are disposed on both sides of the hole section 35 of the surface section 28. On each of the extending portions of the wall plate sections 47, a rotational movement shaft 49 is installed along the vehicle-width direction.

The rotational movement shaft 49 is disposed at a position separated from the curvature section 27.

A retaining member 52 is rotatably supported on the rotational movement shafts 48 of the supporting sections 45 in a state that the retaining member 52 extends toward the inside of the vehicle interior. The retaining member 52 retains the cover 17 shown in FIG. 4, the cover 17 having the opposing section 14 constituting the decoration surface.

The retaining member 52 is press-molded with a plate-shaped steel material. The retaining member 52 includes a pair of extension plate sections 53, a connecting plate section 54, and a pair of opposing plate sections 55.

At the outside of the retaining member 52, the pair of extension plate sections 53 is supported by both ends of the rotational movement shafts 48, respectively. The pair of extension plate sections 53 extends from the ends of the rotational movement shafts 48 toward the inside of the vehicle interior. The connecting plate section 54 connects the distal ends of the extension plate sections 53 to each other. The pair of opposing plate sections 55 extends from the connecting plate section 54 toward the outside of the vehicle interior so as to be disposed opposite to the extension plate sections 53.

On a first extension plate section 53 and a first opposing plate section 55 on a first portion in the vehicle-width direction, a first rotational movement shaft 56 is installed along the vehicle-width direction. On a second extension plate section 53 and a second opposing plate section 55 on a second portion in the vehicle-width direction, a second rotational movement shaft 56 is installed along the vehicle-width direction.

In this case, when the connecting plate section 54 is moved so as to be attached to the cover 17, the opposing section 14 follows the movement of the connecting plate section 54.

A first driving section 58 is disposed so as to connect the rotational movement shaft 56 of the retaining member 52 and the rotational movement shaft 49 of the supporting section 45 on a first portion in the vehicle-width direction. Similarly, a second driving section 58 is disposed so as to connect the rotational movement shaft 56 of the retaining member 52 and the rotational movement shaft 49 of the supporting section 45 on a second portion in the vehicle-width direction.

In this case, each of the driving sections 58 extends from the rotational movement shaft 56 disposed outside the shock absorbing member 25 on the installation side of the driving section to the rotational movement shaft 49 disposed inside the shock absorbing member 25 while passing through the hole section 35 of the surface section 28 and being inserted into the inside of the shock absorbing member 25.

That is, each of the driving sections 58 is provided such that a portion of the driving section is disposed inside the shock absorbing member 25.

Each of the driving sections 58 is configured as a rigid body having a cylinder 60 and a shaft 61 disposed in the cylinder 60 so as to extend toward and retreat from the cylinder 60 by a rotational force of an electric motor introduced through a lead screw (not shown). The driving section 58 is freely expandable and contractible as a whole.

In the driving section 58, the cylinder 60 is rotatably connected to the rotational movement shaft 49 on the portion which is closer to the shock absorbing member 25, and the shaft 61 is rotatably connected to the rotational movement shaft 56 of the retaining member 52. By the shaft 61 moving toward and away from the cylinder 60, the retaining member 52, i.e., the opposing section 14, is caused to rotate and is moved toward and away from the driver.

The driving sections 58 are driven in a synchronized manner. Specifically, when the driving section 58 is in the contracted state in which the shaft 61 is retracted to the maximum extent, the retaining member 52 is positioned outside the vehicle interior. At this moment, the retaining member 52 and the opposing section 14 of the cover 17 fixed to the retaining member 52 are positioned at a standby position. At the standby position, the retaining member 52 is positioned in such a way that the retaining member 52 is farthest away from the driver, as denoted by the two-dotted line in FIG. 6 and the solid line in FIG. 7. In this case, the front portion of the opposing member 14 is raised toward the inside of the vehicle interior, as denoted by the solid line in FIG. 7.

Meanwhile, when the driving section 58 is in the expanded state in which the shaft 61 is extended to the maximum extent, the retaining member 52 is positioned inside the vehicle interior. At this moment, the retaining member 52 and the opposing section 14 of the cover 17 fixed to the retaining member 52 are positioned in such a way that the retaining member 52 is closest to the driver, as denoted by the two-dotted line in FIGS. 4 and 7 and the solid line in FIG. 6. In this case, the bottom portion of the opposing member 14 is extended from the standby position toward the inside of the vehicle interior. In the expanded state, the bottom portion of the opposing member 14 is slightly sloped with respect to the horizontal plane, as denoted by the two-dotted line in FIG. 7.

The cover 17 and the retaining member 52 constitute a rotational movement section 62 that moves the opposing section 14 toward and away from the driver. For such a configuration, the rotational movement shaft 48 which is the center of the rotational movement of the rotational movement section 62 is disposed on the portion which is closer to the front-vehicle.

In such an actuatable knee bolster 11 of the third embodiment provided on the portion which is closer to the driver's seat 10, the actuatable knee bolster 11 is in a standby position when the opposing section 14 is farthest away from the driver. For example, when a seat sensor (not shown) installed in the driver's seat 10 detects that the driver is seated in the driver's seat 10, the rotational movement section 62 moves downward while rotating about the rotational movement shaft 48 disposed on the portion which is closer to the front-vehicle so that the opposing section 14 is positioned at an extending position in which the opposing section 14 extends toward the driver.

Accordingly, the lower legs of the driver are supported by the opposing section 14 at the time of a vehicle collision.

Figure 7:
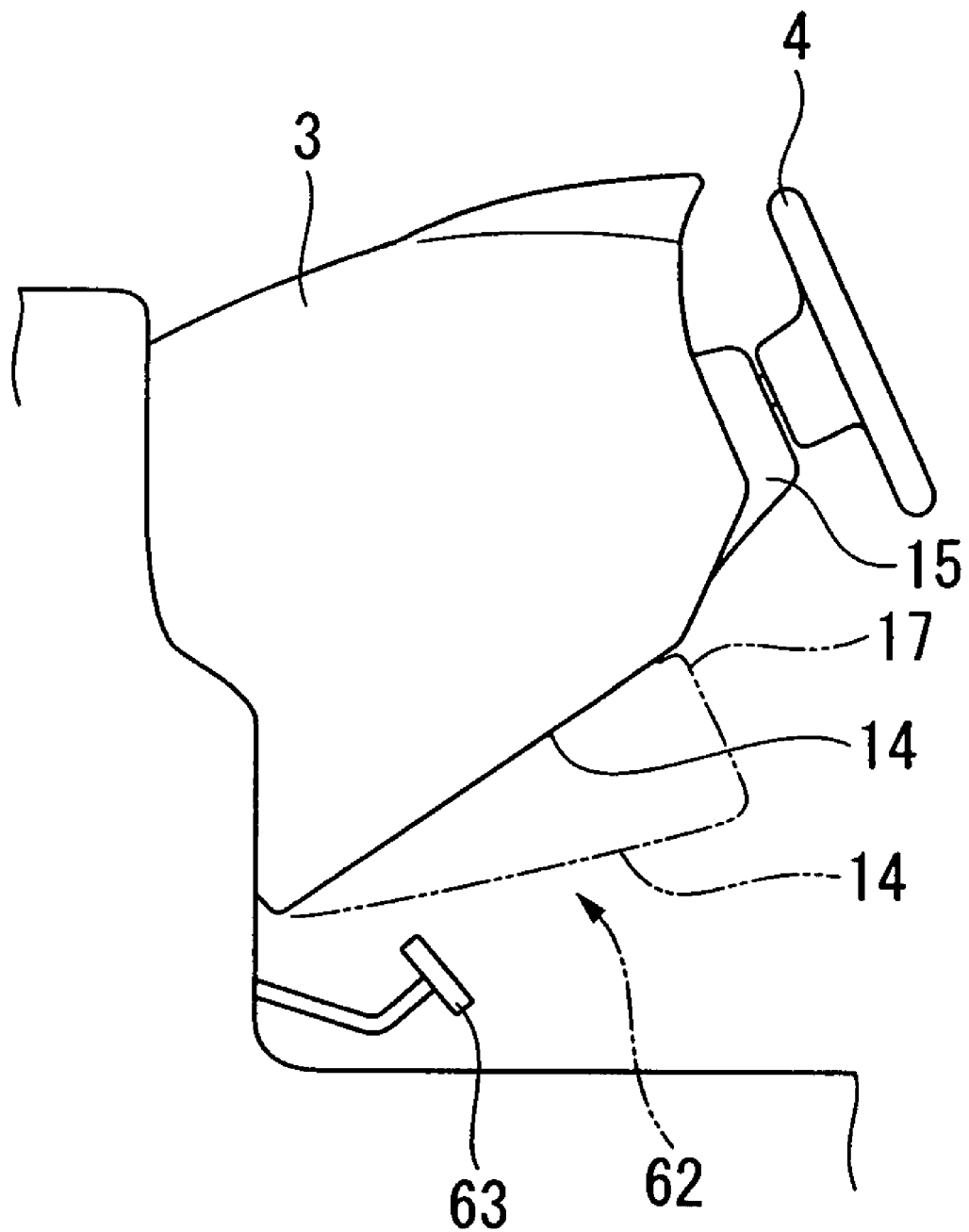
FIG. 7 is a cross-sectional view of a configuration of the actuatable knee bolster and other components such as an instrument panel of the third embodiment of the invention.

Specifically, since the feet of the driver seated in the driver's seat 10 are normally placed on a pedal 63 shown in FIG. 7, the leg of the driver is bent in an inverted V shape so that the angle made by the upper and lower parts of the leg decreases as the driver moves toward the front side of the vehicle. In this case, the joint portion of the upper and lower parts of the leg moves upward with the bending. Accordingly, the impact caused by the upward movement of the joint portion of the leg can be efficiently absorbed by the opposing section 14 extending downward from the instrument panel 3 while slightly sloping the bottom portion of the opposing section 14 with respect to the horizontal plane.

When the opposing section 14 receives a load caused by the upward movement of the driver's joint portion at the time of the vehicle collision, the opposing section 14 presses the driving section 58 having the first end thereof connected to the rotational movement shaft 56. As a result, the load is applied to the supporting section 45 backing the rotational movement shaft 49 connected to the second end of the driving section 58. Thus, the surface section 28 on the vehicle interior side of the shock absorbing member 25 fixed to the supporting section 45 receives the load in a direction toward the outside of the vehicle interior.

When the load exceeds a predetermined value, the surface section 28 of the shock absorbing member 25 which is closer to the vehicle interior and which is connected to the driving section 58 is driven to move toward the surface section 26 disposed outside the vehicle interior opposite in the input direction from the lower legs. The curvature section 27 connecting the surface sections 26 and 28 to each other and the connection member 43 are plastically deformed and bent to absorb the impact.

At this moment, the driving section 58 coming closer to the surface section 26 disposed outside the vehicle interior together with the surface section 28 on the vehicle interior side is inserted in the runout section 80 formed in the surface section 26 disposed outside the vehicle interior. Accordingly, the driving section 58 can move directly into the runout section 80 without making contact with the surface section 26.

The actuatable knee bolster 11 of the third embodiment is configured such that the forward and backward movement of the actuatable knee bolster 11 is controlled in accordance with a state of wearing the seat belt equipment (not shown) of the driver's seat 10. Specifically, the opposing section 14 is positioned at the standby position when the driver is wearing the seat belt equipment of the driver's seat 10. Meanwhile, the opposing section 14 is positioned at the extending position when the driver is not wearing the seat belt equipment of the driver's seat 10.

With such a configuration, the driver can promptly wear the seat belt equipment so that the space for the lower legs is not reduced. Therefore, the actuatable knee bolster 11 of the third embodiment can function as a reminder that causes the driver to wear the seat belt equipment.

According to the actuatable knee bolster 11 of the third embodiment described above, since the rotational movement shaft 48 which is the center of the rotational movement of the rotational movement section 62 is disposed on the front side of the vehicle, the portion of the opposing section 14 which is closer to the rear side of the vehicle moves downward. Accordingly, it is possible to secure the space in which the feet of the driver seated in the driver's seat 10 can freely move.

Since the driver's feet are normally placed on the pedal 63, the driver bends their leg so that the angle made by the upper and lower parts of the leg decreases as the driver moves toward the front side of the vehicle. In this case, since the joint portion of the upper and lower parts of the leg moves upward when bending, it is possible to dispose the opposing section 14 in a direction substantially perpendicular to the upward movement of the joint portion of the leg.

Accordingly, it is possible to absorb the impact energy in an efficient manner.

Since the opposing section 14 configured to extend toward and retreat from the instrument panel 3 is disposed on the portion of the column cover 15 which is closer to the front side of the vehicle, the boundary line of the instrument panel 3 and the rotational movement section 62 in the absorbed state hidden from view by the presence of the column cover 15. Accordingly, the overall exterior appearance is improved.

In addition, since the driving section 58 that drives the opposing section 14 to move toward and away from the driver is disposed inside the shock absorbing section 25, the overall size of the actuatable knee bolster 11 can be made compact. Moreover, it is not required to increase the layout space of the actuatable knee bolster 11 in the instrument panel 3. Accordingly, it is possible to install the actuatable knee bolster 11 in a small space.

Since it is possible to decrease the layout space in the instrument panel 3, it is possible to suppress an effect on the degree of freedom in designing other functional components.

When the shock absorbing section 25 receives the load applied from the lower legs of the driver to the opposing section 14 via the driving section 58, the first surface section 28 connected to the driving section 58 is driven to move toward the second surface section 26 opposite to the first surface section 28 in the input direction from the lower legs.

At this moment, the curvature section 27 connecting the surface sections 26 and 28 to each other is bent to absorb the impact. In this case, the driving section 58 coming closer to the second surface section 26 together with the first surface section 28 is inserted in the runout section 33 formed in the second surface section 26. Accordingly, the driving section 58 can move directly into the runout section 33.

Therefore, the shock absorbing section 25 can be greatly deformed even when the actuatable knee bolster is realized in a compact configuration.

The driving section 58 is connected to a portion separated from the curvature section 27 in the first surface section 28 of the shock absorbing section 25. Therefore, when the shock absorbing section 25 receives the load applied from the lower legs of the driver to the opposing section 14 via the driving section 58, the curvature section 27 is efficiently bent by the first surface section 28. Accordingly, it is possible to absorb the impact in a more efficient manner.

In the third embodiment, under the same movement of the shaft 61, the rotational movement shaft 56 in the distal end of the shaft 61 can extend further out, compared to the case where the rotational movement shaft 49 for rotatably supporting the cylinder 60 of the driving section 58 is offset from the forward and backward movement direction of the shaft 61 so that the rotational movement shaft 49 is disposed so as to be perpendicular to the forward and backward movement direction of the shaft 61.

Fourth Embodiment

Hereinafter, an actuatable knee bolster in accordance with a fourth embodiment of the invention will be described with reference to FIGS. 4, 5, and 8.

As shown in FIG. 4, the actuatable knee bolster 213 of the fourth embodiment is provided on the lower portion on the portion of the instrument panel 3 which is closer to the passenger seat 12 so as to protect the lower legs of the occupant seated in the passenger seat 12.

The actuatable knee bolster 213 is configured to move an opposing section 70 constituting a decoration surface of the vehicle interior 2 and disposed opposite to the lower legs of the driver seated in the driver's seat 10 so as to extend toward and retreat from the instrument panel 3 toward and away from the lower legs of the driver in a reversible manner.

In FIG. 4, the state in which the opposing section 70 moves away from the occupant is shown with the solid line, and the state in which the opposing section 70 moves toward the occupant is shown with the two-dotted line.

Figure 5:
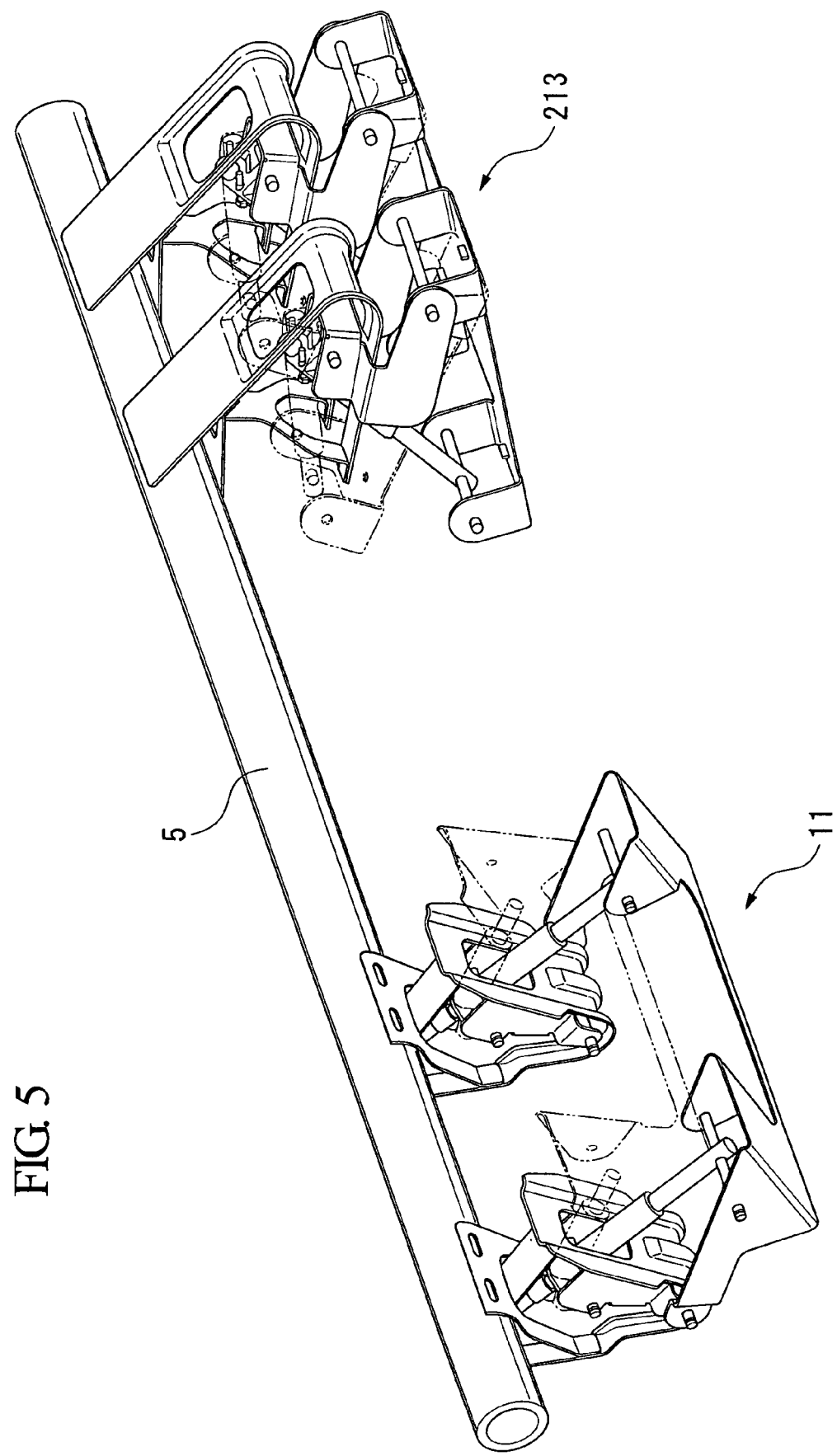
FIG. 5 is a perspective view of a configuration of the actuatable knee bolster of the third embodiment and the fourth embodiment of the invention.

The actuatable knee bolster 213 of the fourth embodiment is provided on the right side (i.e. on the passenger seat 12), as shown in FIG. 5.

Figure 8:
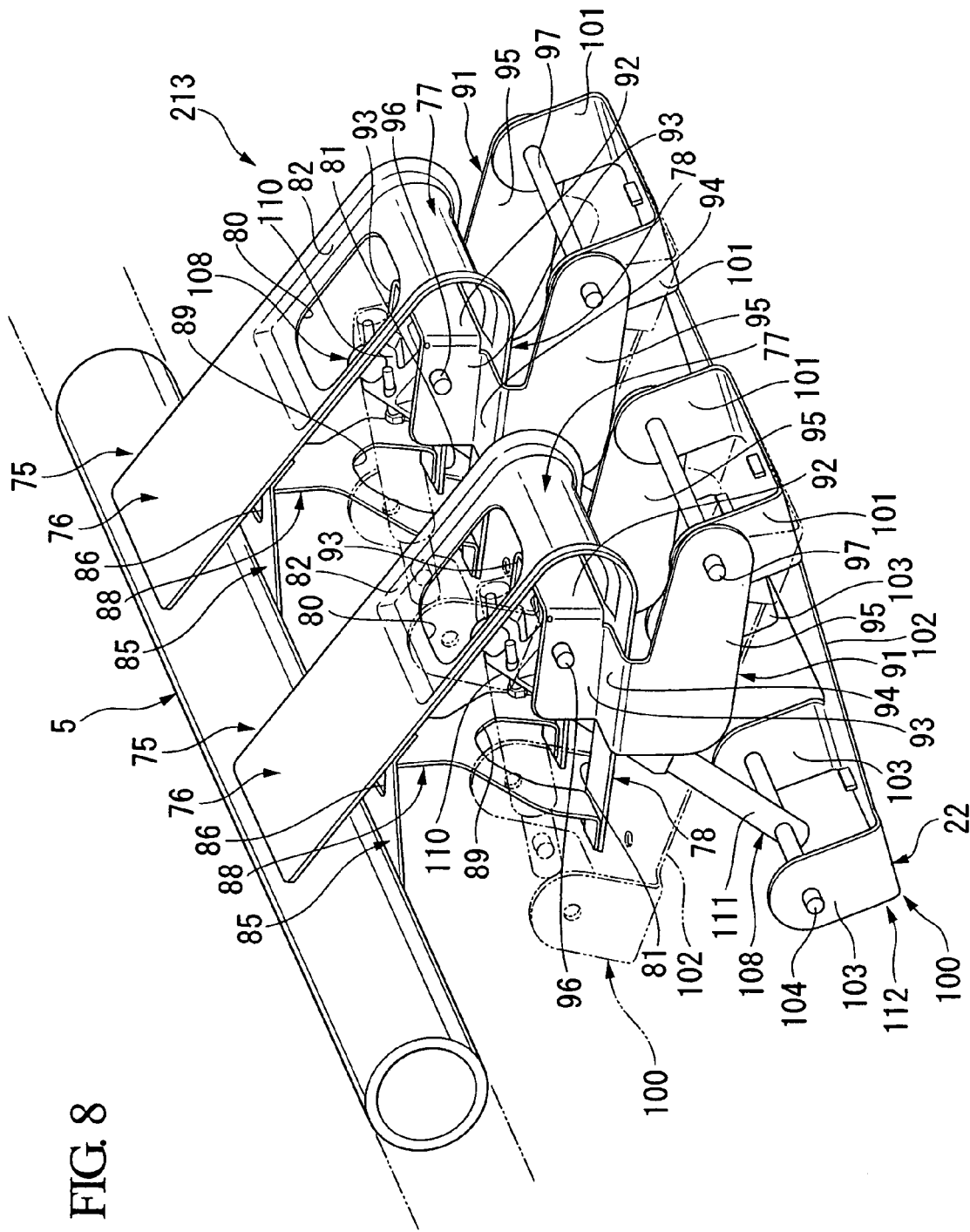
FIG. 8 is a perspective view of a configuration of the actuatable knee bolster of the fourth embodiment of the invention.

FIG. 8 is a perspective view of a configuration of mechanical components excluding a cover 71 shown in FIG. 4. The cover 71 has the opposing section 70 constituting the decoration surface of the actuatable knee bolster 213 of the fourth embodiment.

The actuatable knee bolster 213 includes a plurality of, specifically a pair of, shock absorbing members (shock absorbing sections) 75 that are fixed to the steering support member 5 with a predetermined gap between the members in the vehicle-width direction.

The shock absorbing members 75 are press-molded with a plate-shaped steel material. Each of the shock absorbing members 75 includes a surface section 76 having an entirely flat shape that is fixed to the front side (when viewed by the occupant) of the steering support member 5 and extends toward the inside of the vehicle interior (i.e., toward the occupant), a curvature section (curve section) 77 that is bent from the edge portion on the vehicle interior side of the surface section 76 and is folded back toward the outside of the vehicle interior, and a surface section 78 having an entirely flat shape that extends toward the outside of the vehicle interior from the edge portion of the curvature section 77 opposite to the surface section 76. Each of the shock absorbing members 75 has a substantially U shape when viewed from a side view.

A hole-shaped runout section 80 is formed at a portion of the surface section 76 which is closer to the curvature section 77 and in the central portion of the surface section 76 in the vehicle-width direction.

A notch section 81 opened at the outside of the vehicle interior is formed in the central portion of the surface section 78 in the vehicle-width direction disposed opposite to the curvature section 77.

In the shock absorbing member 75, an embossed bead section 82 is formed in the central portion of the shock absorbing member 75 in the vehicle-width direction so as to increase the stiffness of the shock absorbing member 75, and extend from a portion of the surface section 76 disposed closer to the outside of the vehicle interior than the runout section 80 to the curvature section 77 and the surface section 78.

The actuatable knee bolster 213 includes a pair of connection members 85 that are fixed to the steering support member 5 on the lower side corresponding to the attachment positions of the steering support member 5 and the shock absorbing members 75, and extend toward the inside of the vehicle interior so as to be fixed to the corresponding shock absorbing member 75.

The connection members 85 are press-molded with a plate-shaped steel material, and are fixed to a portion of the surface section 76 of the corresponding shock absorbing member 75 disposed closer to the outside of the vehicle interior than the runout section 80.

In each of the connection members 85, a notch section 86 opened at the inside of the vehicle interior is formed in the central portion of the connection member 86 in the vehicle-width direction, and has a substantially inverted C shape when viewed from a plan view.

The actuatable knee bolster 213 also includes a pair of connection members 88 which are fixed to the surface section 76 on the upper side of each of the shock absorbing members 75 and to the surface section 78 on the lower side of each of the shock absorbing members 75, while passing through the notch section 86 of the connection member 85 and extending downward.

The connection members 88 are also press-molded with a plate-shaped steel material. The connection members 88 are shaped such that the widths thereof increase as they go downward. A notion section 89 opened downward is formed in the central portion of the connection member 88 in the vehicle-width direction. The connection member has a substantially inverted Y shape when viewed from the front view.

In each of the shock absorbing members 75, a supporting section 91 is fixed to the top surface of the surface section 78 on the lower side of the shock absorbing member 75, and the supporting section 91 is press-molded with a plate-shaped steel material.

The supporting section 91 includes an intermediate plate section 92 extending in the vehicle-width direction from a portion on the curvature section 77 side of the surface section 78, a pair of wall plate sections 93 bent from both sides in the vehicle-width direction of the intermediate plate section 92 and extending toward the outside of the vehicle interior, a pair of bottom plate sections 94 (only a single section is shown in the drawing) extending away from the lower edge portions of the wall plate sections 93 and fixed to a portion of the surface section 78 disposed closer to the curvature section 77 than the notch section 81, and a pair of backing plate sections 95 bend downward from both edge portions in the vehicle-width direction of the bottom plate section 94 and extending toward the inside of the vehicle interior.

On the wall plate sections 93, one rotational movement shaft 96 is installed along the vehicle-width direction. On the backing plate sections 95, the other rotational movement shaft 97 is installed along the vehicle-width direction.

A retaining member 100 for retaining the cover 71 including the opposing section 70 constituting the decoration surface is rotatably supported on the rotational movement shafts 97 of the supporting sections 91.

The retaining member 100 is press-molded with a plate-shaped steel material. The retaining member 100 includes two pairs of extension plate sections 101 connected to the respective ends of the rotational movement shafts 97 and extending toward the inside of the vehicle interior, a main plate section 102 connecting the respective distal ends of the extension plate sections 101 to each other and extending toward the outside of the vehicle interior, and two pairs of backing plate sections 103 extending upward from a portion of the main plate section 102 disposed outside the vehicle interior.

On the pair of backing plate sections 103 on a first portion in the vehicle-width direction, a first rotational movement shaft 104 is installed along the vehicle-width direction. On the pair of backing plate sections 103 on a second portion in the vehicle-width direction, a second rotational movement shaft 104 (although not shown in the drawing) is installed along the vehicle-width direction.

In this case, when the main plate section 102 is moved so as to be attached to the cover 71, the opposing section 70 follows the movement of the main plate section 102.

A first driving section 108 is disposed so as to connect the rotational movement shaft 104 of the retaining member 100 and the rotational movement shaft 96 of the supporting section 91 on a first portion in the vehicle-width direction. Similarly, a second driving section 108 is disposed so as to connect the rotational movement shaft 104 of the retaining member 100 and the rotational movement shaft 96 of the supporting section 91 on the second portion in the vehicle-width direction.

In this case, each of the driving sections 108 extends from the rotational movement shaft 104 disposed outside the shock absorbing member 75 on the installation side of the driving section to the rotational movement shaft 96 disposed inside the shock absorbing member 75 while passing through the notch section 81 of the surface section 78 and being inserted into the inside of the shock absorbing member 75.

That is, each of the driving sections 108 is provided such that a portion of the driving section is disposed inside the shock absorbing member 75.

Each of the driving sections 108 is configured as a rigid body having a cylinder 110 and a shaft 111 disposed in the cylinder 110 so as to extend toward and retreat from the cylinder 110 by a rotational force of an electric motor introduced through a lead screw (not shown). The driving section 108 is freely expandable and contractible as a whole.

In the driving section 108, the cylinder 110 is rotatably connected to the rotational movement shaft 96 which is closer to the shock absorbing member 75, and the shaft 111 is rotatably connected to the rotational movement shaft 104 of the retaining member 100. By the shaft 111 moving toward and away from the cylinder 110, the retaining member 100 is caused to rotate and is moved toward and away from the occupant.

In this case, the driving sections 108 are driven in a synchronized manner. Specifically, when the driving section 108 is in the contracted state in which the shaft 111 is retracted to the maximum extent, the retaining member 100 is positioned outside the vehicle interior, as denoted by the two-dotted line in FIG. 8. At this moment, the opposing section 70 of the cover 71 retained by the retaining member 100 is positioned at a standby position. At the standby position, the retaining member 100 is positioned in such a way that the retaining member 100 is farthest away from the occupant in a state in which the front portion of the opposing section 70 is raised toward the inside of the vehicle interior.

Meanwhile, when the driving section 108 is in the expanded state in which the shaft 111 is extended to the maximum extent, the retaining member 100 is positioned inside the vehicle interior, as denoted by the solid line in FIG. 8. At this moment, the retaining member 100 is positioned in such a way that the retaining member 100 is closest to the occupant. In this case, the front portion of the opposing member 14 is raised from the standby position toward the inside of the vehicle interior while making substantially right angle.

The cover 71 and the retaining member 100 constitute a rotational movement section 112 that moves the opposing section 70 toward and away from the driver. For such a configuration, the rotational movement shaft 97 which is the center of the rotational movement of the rotational movement section 112 is disposed on the rear side of the vehicle.

In such an actuatable knee bolster 213 of the fourth embodiment, the actuatable knee bolster 213 is in a standby position when the opposing section 70 is farthest away from the occupant. For example, when a seat sensor (not shown) installed in the passenger seat 12 detects that the occupant is seated in the passenger seat 12, the rotational movement section 112 moves backward with respect to front-to-back direction of the vehicle while rotating about the rotational movement shaft 97 disposed on the rear side of the vehicle so that the opposing section 70 is positioned at an extending position in which the opposing section 70 extends toward the occupant.

Accordingly, the lower legs of the occupant are supported by the opposing section 70 at the time of vehicle collision.

Specifically, since the feet of the occupant seated in the passenger seat 12 are not normally placed on a pedal, the legs of the occupant are moved forward without being bent as the occupant moves toward the front side of the vehicle. Accordingly, the impact caused by the forward movement of the legs can be efficiently absorbed by the opposing section 70 extending downward from the instrument panel 3 while making a substantially right angle.

When the retaining member 100 receives a load from the occupant at the time of the vehicle collision, the retaining member 100 presses the driving section 108 having the first end thereof connected to the rotational movement shaft 104. As a result, the load is applied to the supporting section 91 backing the rotational movement shaft 96 connected to the second end of the driving section 108. Thus, the surface section 78 on the lower side of the shock absorbing member 75 fixed to the supporting section 91 receives the load in such a direction that the front portion of the surface section 78 is raised.

When the load exceeds a predetermined value, the surface section 78 of the shock absorbing member 75 connected to the driving section 108 is driven to move toward the surface section 76 disposed on the upper side of the shock absorbing member 75 opposite in the input direction from the lower legs, i.e., in such a direction that the front portion thereof is raised. The curvature section 77 connecting the surface sections 76 and 78 to each other and the connection member 88 are plastically deformed and bent to absorb the impact.

At this moment, the driving section 108 coming closer to the surface section 76 disposed on the upper side together with the surface section 78 disposed on the lower side is inserted in the runout section 80 formed in the surface section 76 disposed on the upper side. Accordingly, the driving section 108 can move directly into the runout section 80 without making contact with the surface section 76.

The actuatable knee bolster 213 of the fourth embodiment is configured such that the forward and backward movement of the actuatable knee bolster 11 is controlled in accordance with a state of wearing the seat belt equipment (not shown) of the passenger seat 12. Specifically, the opposing section 70 is positioned at the standby position when the occupant is wearing the seat belt equipment of the passenger seat 12. Meanwhile, the opposing section 70 is positioned at the extending position when the occupant is not wearing the seat belt equipment of the passenger seat 12.

With such a configuration, the occupant can promptly wear the seat belt equipment so that the space for the lower legs is not reduced. Therefore, the actuatable knee bolster 213 of the fourth embodiment can function as a reminder that causes the occupant to wear the seat belt equipment.

According to the actuatable knee bolster 213 of the fourth embodiment, since the feet of the occupant seated in the passenger seat 12 are not normally placed on a pedal, the legs of the occupant are moved forward without being bent as the occupant moves toward the front side of the vehicle. However, since the rotational movement shaft 97 which is the center of the rotational movement of the rotational movement section 112 is disposed on the rear side of the vehicle, the portion of the opposing section 70 which is closer to the front side of the vehicle moves downward. Accordingly, it is possible to advantageously dispose the opposing section 70 in a direction opposite to the moving direction of the legs.

Accordingly, it is possible to absorb the impact energy in an efficient manner.

Since the center of the rotational movement of the rotational movement section 112 is disposed on the rear side of the vehicle (i.e., in the vicinity of a boundary line of the rotational movement section 112 and the instrument panel 3), the instrument panel 3 and the rotational movement section 112 in the absorbed state can be aligned relative to each other with high precision. Accordingly, the overall exterior appearance is improved.

Fifth Embodiment

Figure 9:
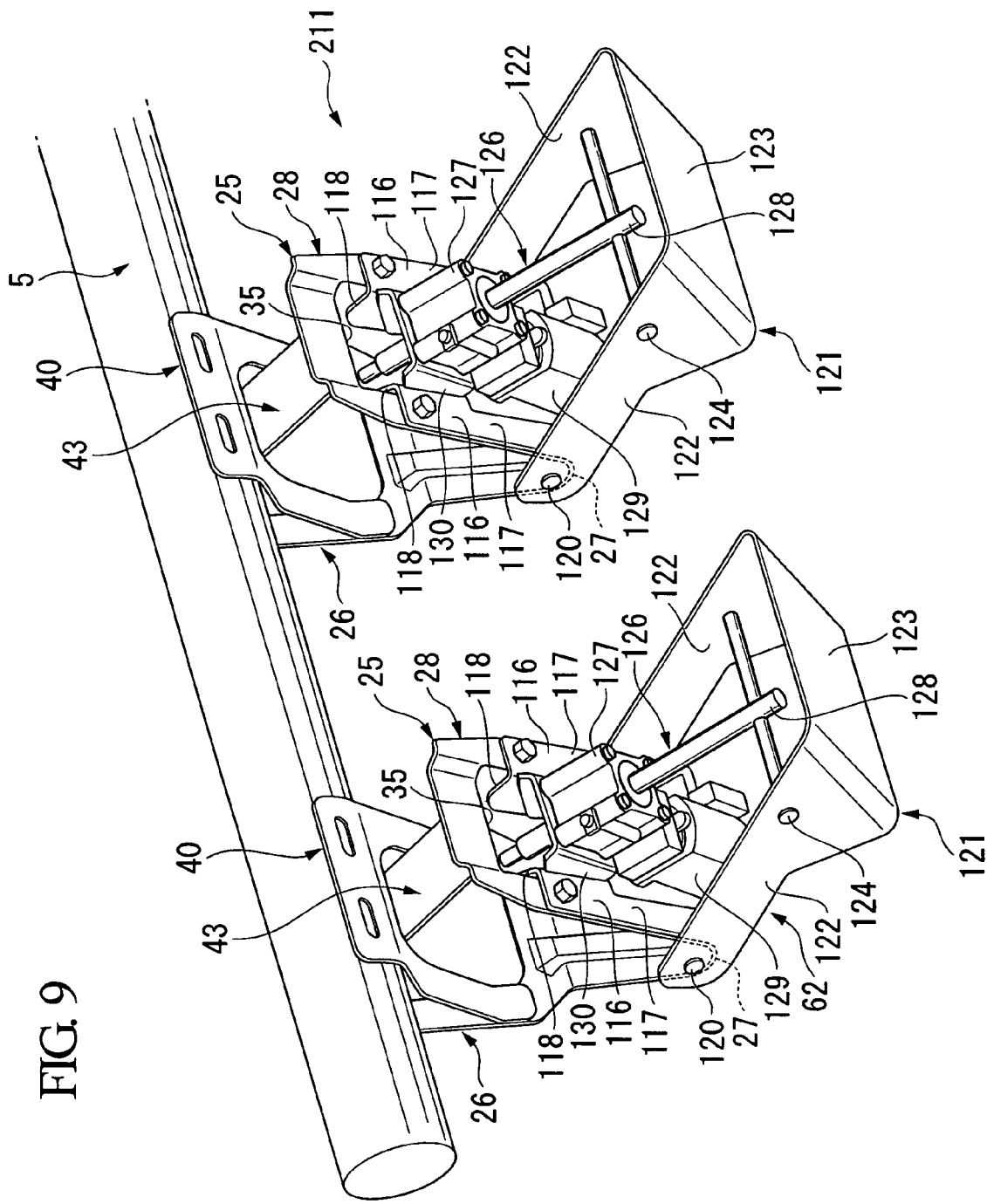
FIG. 9 is a perspective view of a configuration of the actuatable knee bolster of a fifth embodiment of the invention.

Hereinafter, an actuatable knee bolster in accordance with a fifth embodiment of the invention will be described with reference to FIG. 9, with a focus on parts different from those of the third embodiment.

Similar to the third embodiment, the actuatable knee bolster 211 of the fifth embodiment is provide on the portion of the instrument panel 3 which is closer to the driver's seat 10 so as to protect the lower legs of a driver seated in the driver's seat 10.

The actuatable knee bolster 211 of the fifth embodiment includes a pair of shock absorbing members 25, a pair of connection members 40, and a pair of connection members 43, which are the same as those of the third embodiment.

In each of the shock absorbing members 25, a pair of backing boards 116 that are press-molded with a plate-shaped steel material are fixed onto a portion on the vehicle interior side of the surface section 28.

Each of the backing boards 116 includes a fixed plate section 117 fixed to a portion on the vehicle interior side of the surface section 28, and an extension plate section 118 extending from the fixed plate section 117 toward the outside of the vehicle interior via a hole section 35. On portions disposed outside the vehicle interior in the extension plate sections 118 inserted through the hole section 35, a rotational movement shaft (not shown) is installed along the vehicle-width direction.

Rotational movement shafts 120 are installed on portions disposed inside the curvature section 27 in the shock absorbing members 25.

A pair of retaining members 121 are rotatably supported on the rotational movement shafts 120 in a state that the retaining members 121 extend toward the inside of the vehicle interior. The retaining members 121 retain the cover 17 shown in FIG. 4 and constitute the rotational movement section 62.

The retaining members 121 are also press-molded with a plate-shaped steel material. Each of the retaining members 121 includes a pair of extension plate sections 122 and a connecting plate section 123.

The pair of extension plate sections 122 is supported by both ends of a corresponding rotational movement shaft 120. The extension plate section 122 extends from the rotational movement shaft 120 toward the inside of the vehicle interior. The connecting plate section 123 connects the distal ends of the extension plate sections 122 to each other.

On the extension plate sections 122 of each of the retaining members 121, rotational movement shafts 124 are installed along the vehicle-width direction.

In this case, when the connecting plate section 123 is moved so as to be attached to the cover 17, the opposing section 14 follows the movement of the connecting plate section 123.

Driving sections 126 are disposed so as to connect the rotational movement shaft 124 of each of the retaining members 121 and the rotational movement shaft (not shown) of the backing boards 116 on the same side of the vehicle-width direction.

Each of the driving sections 126 includes a base 127, a shaft 128 configured to extend toward and retreat from the base 127, and an electric motor 129 for driving the shaft 128 to move toward and away from the base 127 by a driving mechanism (now shown) provided in the base 127.

In the driving section 126, the base 127 is rotatably connected to the rotational movement shaft (not shown) which is closer to the shock absorbing member 25 via a bracket 130. The shaft 128 is rotatably connected to the rotational movement shaft 124 of the retaining member 121. By the shaft 128 moving toward and away from the base 127, the retaining member 121, i.e., the opposing section 14 of the cover 17 shown in FIG. 4 is caused to rotate and is moved toward and away from the driver.

In this case, the driving sections 126 are driven in a synchronized manner. Specifically, when the driving section 126 is in the contracted state in which the shaft 128 is retracted to the maximum extent, the retaining member 121 is positioned outside the vehicle interior. At this moment, the opposing section 14 of the cover 17 retained by the retaining members 121 is positioned at a standby position. At the standby position, the opposing section 14 is farthest away from the driver in a state in which the front portion of the opposing section 14 is raised toward the inside of the vehicle interior.

Meanwhile, when the driving section 126 is in the expanded state in which the shaft 128 is extended to the maximum extent, the retaining members 121 are positioned inside the vehicle interior. At this moment, the opposing section 14 is positioned at an extending position. At the extending position, the opposing section 14 is closest to the driver. In this case, the front portion of the opposing member 14 is raised from the standby position while slightly sloping the bottom portion of the opposing section 14 with respect to the horizontal plane.

In such an actuatable knee bolster 211 of the fifth embodiment provided on the portion which is closer to the driver's seat 10, since the cover 17 and the retaining member 121 constitute the rotational movement section 62 that moves the opposing section 14 toward and away from the driver and the rotational movement shaft 120 which is the center of the rotational movement of the rotational movement section 62 is disposed on the front side of the vehicle, it is possible to achieve the same advantage as that obtainable from the third embodiment.

Sixth Embodiment

Figure 10:
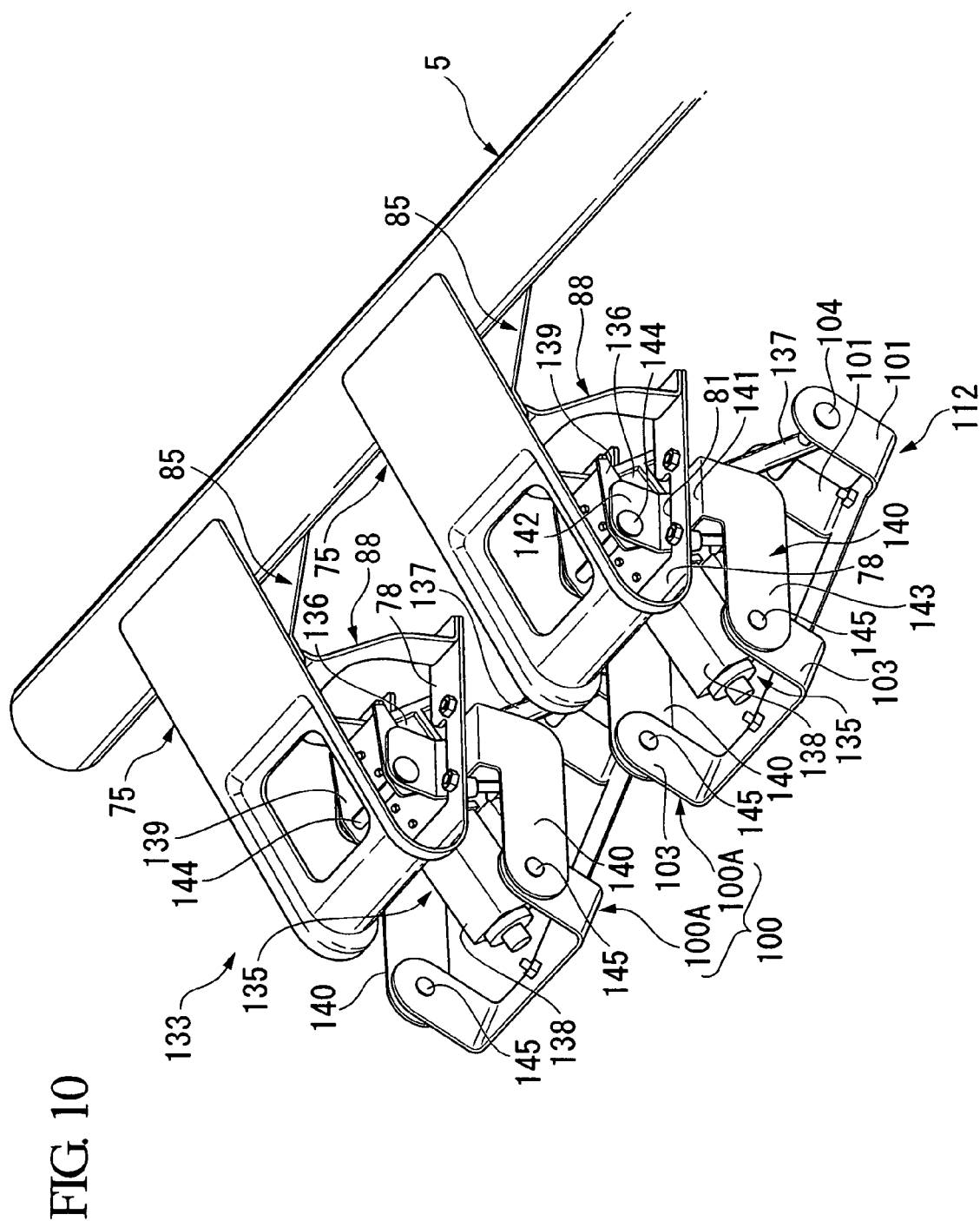
FIG. 10 is a perspective view of a configuration of the actuatable knee bolster of a sixth embodiment of the invention.

Hereinafter, an actuatable knee bolster in accordance with a sixth embodiment of the invention will be described with reference to FIG. 10, with a focus on parts different from those of the fourth embodiment.

Similar to the fourth embodiment, the actuatable knee bolster 133 of the sixth embodiment is provided on the portion which is closer to the passenger seat 12 of the instrument panel 3 so as to protect the lower legs of the occupant seated in the passenger seat 12.

The actuatable knee bolster 133 of the sixth embodiment includes a pair of shock absorbing members 75, a pair of connection members 85, and a pair of connection members 88, which are the same as those of the fourth embodiment.

In each of the shock absorbing members 75, a pair of backing boards 140 that are press-molded with a plate-shaped steel material are fixed onto the surface section 78.

Each of the backing boards 140 includes a fixed plate section 141, an extension plate section 142, and a supporting section 143.

The fixed plate section 141 is fixed to a portion on the vehicle interior side of the surface section 78. The extension plate section 142 extends upward from the fixed plate section 141 via a notch section 81. The supporting section 143 extends downward from the fixed plate section 141. On the extension plate sections 142 inserted through the notch section 81, a rotational movement shaft 144 is installed along the vehicle-width direction.

A rotational movement shaft 145 is installed in the distal end of the supporting section 143. Unlike the fourth embodiment, in the sixth embodiment, the retaining member 100 configured to retain the cover 71 and constituting the rotational movement section 112 is divided into two fragments 100A respectively including a pair of extension plate sections 101 and a pair of extension plate sections 103. Each of the fragments 100A is rotatably supported by the rotational movement shaft 145 on the rear side of the vehicle.

In the sixth embodiment, each of the driving section 135 includes a base 136, a shaft 137 configured to extend toward and retreat from the base 136, and an electric motor 138 for driving the shaft 137 to move toward and away from the base 136 by a driving mechanism (now shown) provided in the base 136.

In the driving section 135, the base 136 is rotatably connected to the rotational movement shaft 144 via a bracket 139, and the shaft 137 is rotatably connected to the rotational movement shaft 104 of the fragment 100A. By the shaft 137 moving toward and away from the base 136, the fragment 100A is caused to rotate and is moved toward and away from the occupant.

In this case, the driving sections 135 are driven in a synchronized manner. Specifically, when the driving section 135 is in the contracted state in which the shaft 137 is retracted to the maximum extent, the fragment 100A is positioned outside the vehicle interior. At this moment, the fragment 100A is positioned in such way that the fragment 100A is farthest away from the occupant in a state in which the front portion of the opposing section 70 is raised toward the inside of the vehicle interior.

Meanwhile, when the driving section 135 is in the expanded state in which the shaft 137 is extended to the maximum extent, the fragment 100A is positioned inside the vehicle interior. At this moment, the fragment 100A is positioned in such a way that the fragment 100A is closest to the occupant. In this case, the front portion of the opposing member 70 is raised from the standby position while making a substantially right angle.

In such an actuatable knee bolster 133 of the sixth embodiment, since the cover 71 and the fragments 100A constitute the rotational movement section 112 and the rotational movement shaft 145 which is the center of the rotational movement of the rotational movement section 112 is disposed on the rear side of the vehicle, it is possible to achieve the same advantage as that obtainable from the fourth embodiment.

Seventh and Eighth Embodiments

Hereinafter, seventh and eighth embodiments of the invention will be described with referenced to the attached drawings.

Figure 11:
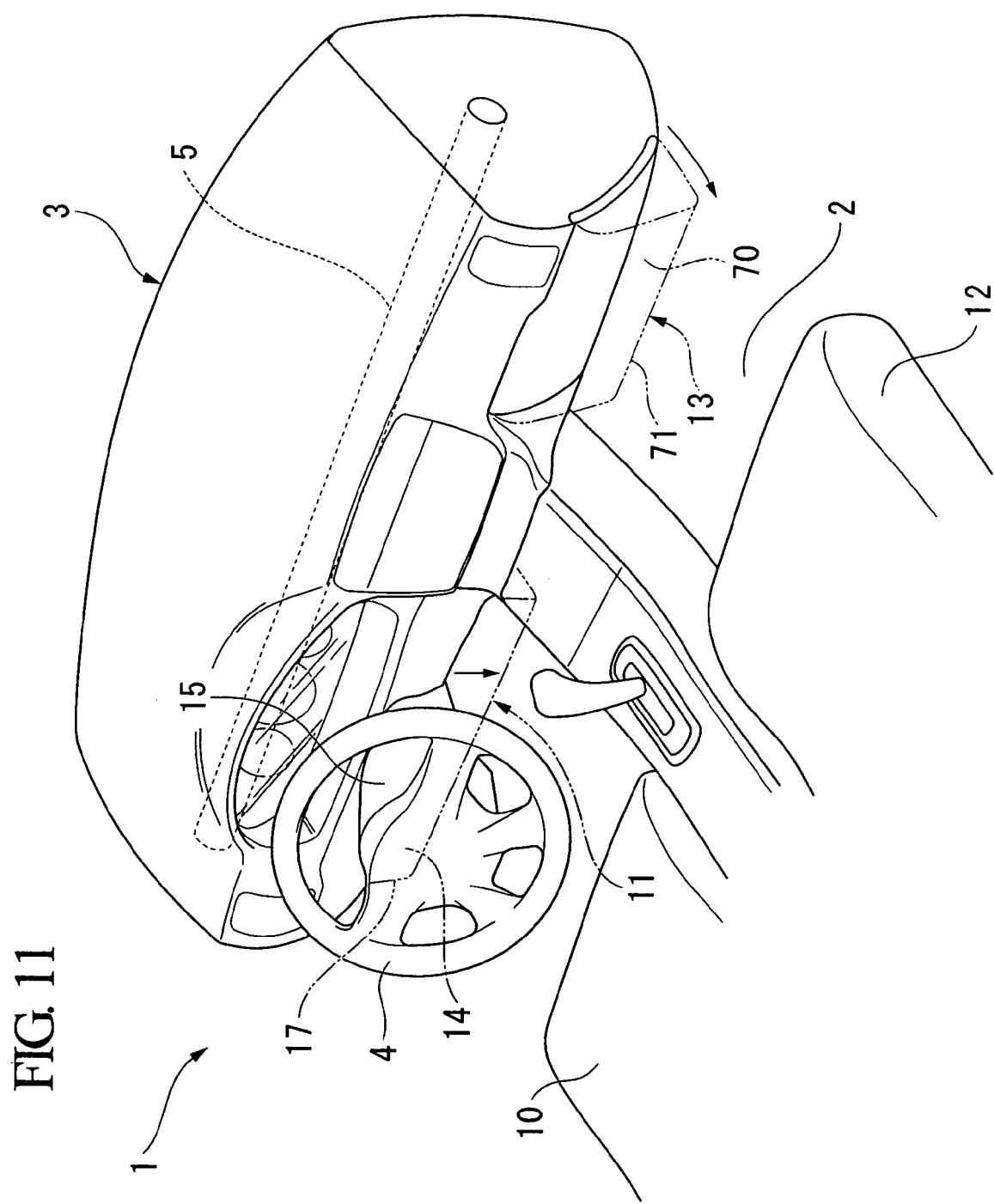
FIG. 11 is a perspective view of a front portion of an interior of a vehicle including an actuatable knee bolster of a seventh embodiment and an eighth embodiment of the invention.

FIG. 11 is a perspective view of a front portion of an interior 2 of a vehicle 1, in which an instrument panel 3 is provided on the front portion of the vehicle interior 2.

In the instrument panel 3, a steering support member 5 that supports a steering shaft (not shown) connected to a steering wheel 4 is disposed along the vehicle-width direction. Both ends of the steering support member 5 are fixed to left and right-side front pillars (not shown) that is a frame member of the vehicle's body.

The steering support member 5 is made of a cylindrical steel material having a high stiffness, and has a function of increasing the stiffness of the vehicle body by being connected to the left and right-side front pillars.

Figure 12:
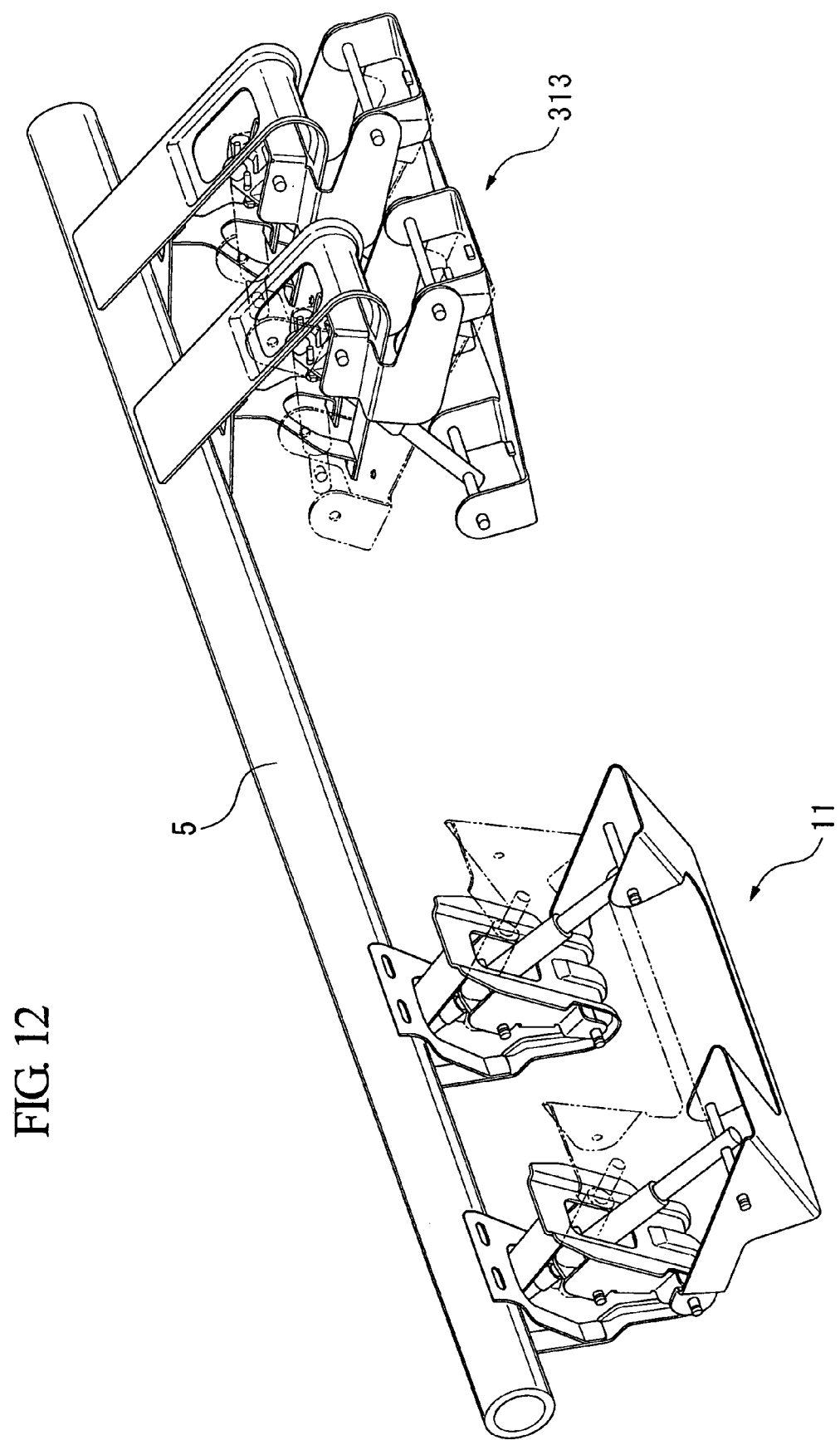
FIG. 12 is a perspective view of a configuration of the actuatable knee bolster of the seventh embodiment and the eighth embodiment of the invention.

The actuatable knee bolster 11 of the seventh embodiment is provided on the left side (i.e., on a driver's seat 10) of the steering support member 5, as shown in FIG. 12. Meanwhile, the actuatable knee bolster 313 of the eighth embodiment is provided on the right side (i.e., on a passenger seat 12) of the steering support member 5.

As shown in FIG. 1, the actuatable knee bolster 11 of the seventh embodiment provided on the driver's seat 10 of the instrument panel 3 is provided on the lower portion of the instrument panel 3 so as to protect the lower legs of the driver seated in the driver's seat 10.

The actuatable knee bolster 11 provided on the driver's seat 10 is configured to move an opposing section 14 constituting a decoration surface of the vehicle interior 2. The opposing section 14 is disposed opposite to the lower legs of the driver seated in the driver's seat 10. The actuatable knee bolster 11 allows the opposing section 14 to extend toward and retreat from the instrument panel 3. Thereby, the opposing section 14 is extended toward and away from the lower legs of the driver in a reversible manner.

In FIG. 1, the state in which the opposing section 14 moves toward the driver is shown with a two-dotted line.

In the instrument panel 3, a column cover 15 extending toward the rear side of the vehicle is provided above the actuatable knee bolster 1, and a steering wheel 4 is provided on the portion of the column cover 15 which is closer to the rear side of the vehicle.

Meanwhile, the opposing section 14 is disposed on the portion of the column cover 15 which is closer to the front side of the vehicle.

Figure 13:
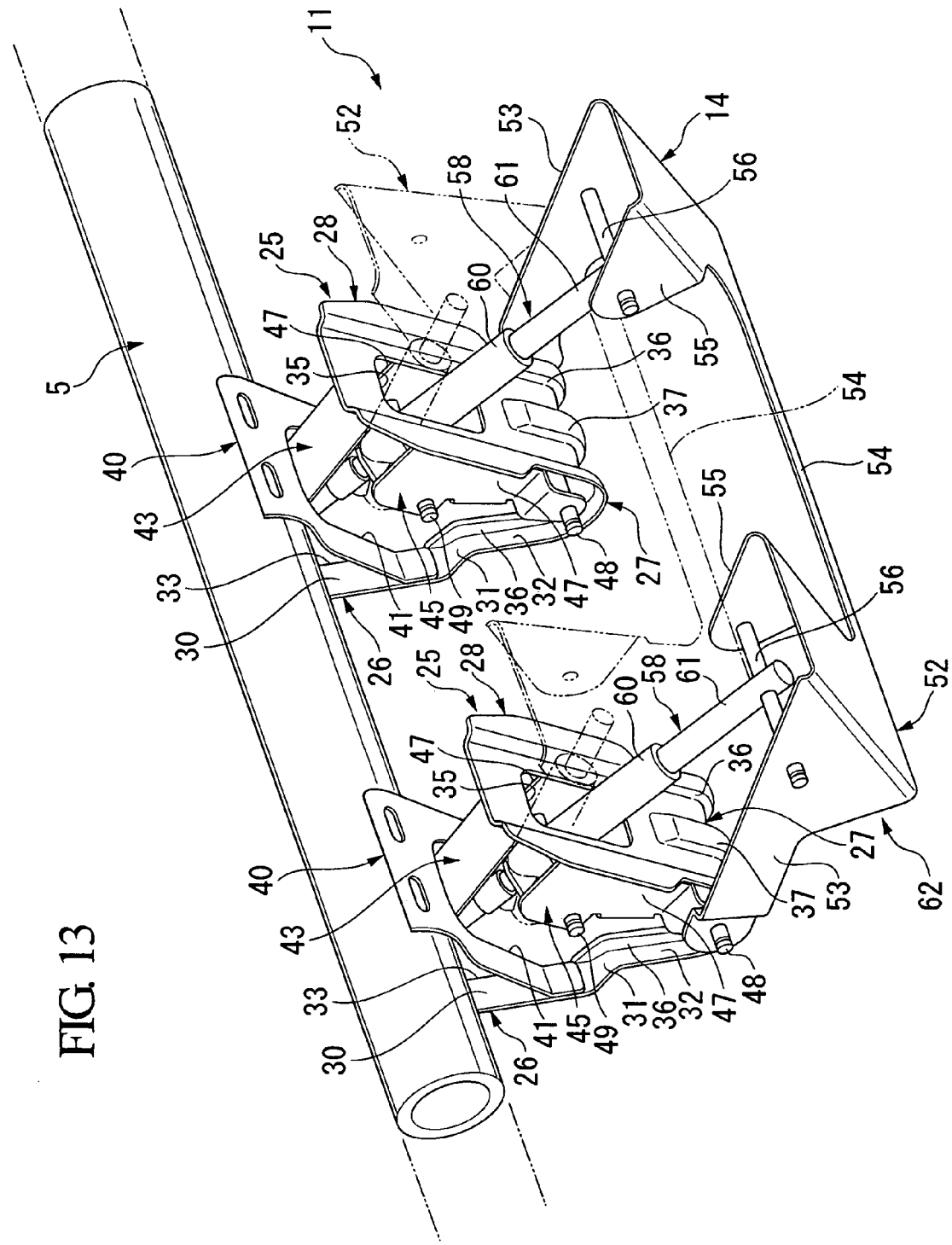
FIG. 13 is a perspective view of a configuration of the actuatable knee bolster of the seventh embodiment of the invention.

FIG. 13 is a perspective view of a configuration of mechanical components excluding a cover 17 shown in FIG. 11. The cover 17 has the opposing section 14 constituting the decoration surface of the actuatable knee bolster 11.

The actuatable knee bolster 11 includes a plurality of, specifically a pair of, shock absorbing members 25 that are fixed to the steering support member 5 with a predetermined gap between the members in the vehicle-width direction.

The shock absorbing members 25 are press-molded with a plate-shaped steel material. Each of the shock absorbing members 25 includes a surface section 26, a curvature section 27, and a surface section (the first surface section) 28. Each of the shock absorbing members 25 has a substantially U shape when viewed from a side view.

The surface section 26 has an entirely flat shape that is fixed to the rear side (when viewed from the driver) of the steering support member 5 and extends downward. The curvature section 27 is bent from the lower edge portion of the surface section 26 and is folded back toward the inside of the vehicle interior. The surface section 28 has an entirely flat shape that extends upward from the edge portion of the curvature section 27 opposite to the surface section 26.

The surface section 26 includes an upper plate section 30, a step plate section 31, and a lower plate section 32.

The upper plate section 30 has its upper end portion fixed to the steering support member 5 and extends downward from the steering support member 5. The step plate section 31 is bent from the lower edge portion of the upper plate section 30 and extends slightly toward the inside of the vehicle interior. The lower plate section 32 is bent from the edge portion on the vehicle interior side of the step plate section 31 and extends downward. The lower edge portion of the lower plate section 32 is connected to the curvature section 27.

In the surface section 26, a notch-shaped runout section 33 opened upward is formed in the central portion of the surface section 26 in the vehicle-width direction and extends over the upper plate section 30, the step plate section 31, and the lower plate section 32.

A hole section 35 is formed in the upper central portion of the surface section 28 in the vehicle-width direction.

In the shock absorbing member 25, a pair of stepped bead sections 36 is formed to increase the stiffness of the shock absorbing member 25. The stepped bead sections 36 extend from the portion of the surface section 26 which is closer to the runout section 33 of the step plate section 31, to the lower plate section 32, the curvature section 27, and the surface section 28, without changing their positions in the vehicle-width direction.

Moreover, on the curvature section 27 and the surface section 28, an embossed bead section 37 is formed between the bead sections 36 to increase the stiffness of the sections 27 and 28, and extends near the hole section 35.

The actuatable knee bolster 11 includes a pair of connection members 40. At the connection members 40, the actuatable knee bolster 11 is fixed to the attachment positions of the shock absorbing member 25 of the steering support member 5 on the vehicle interior side.

The connection members 40 also extend downward so as to be fixed to the corresponding shock absorbing member 25.

The connection members 40 are press-molded with a plate-shaped steel material. The connection members 40 are fixed to the portion of the upper plate section 30 which is closer to the step plate section 31 of the shock absorbing members 25 corresponding to the connection members 40, respectively.

In each of the connection members 40, a notch section 41 opened downward is formed in the central portion of the connection member 40 in the vehicle-width direction in a state in which the position in the vehicle-width direction is aligned with the runout section 33 of the corresponding shock absorbing member 25, and has a substantially inverted C shape when viewed from a front view.

The actuatable knee bolster 11 also includes a pair of connection members 43 which are press-molded with a plate-shaped steel material. The connection members 43 are fixed to the lower surface of the steering support member 5 corresponding to the attachment positions of the steering support member 5 and the shock absorbing members 25. The connection members 43 extend toward the inside of the vehicle interior so as to be fixed to a portion above the hole section 35 in the surface section 28 of the corresponding shock absorbing member 25.

In each of the shock absorbing members 25, a supporting section 45 is disposed between the surface sections 26 and 28, the supporting section 45 being fixed to the surface section 28.

The supporting section 45 is press-molded with a plate-shaped steel material.

The supporting section 45 includes a bottom plate section (not shown) and a pair of wall plate sections 47. The bottom plate section is fixed to a portion of the surface section 28 disposed closer to the curvature section 27 than the hole section 35. The pair of wall plate sections 47 extends from both sides in the vehicle-width direction of the bottom plate section. On a portion of the wall plate sections 47 which is closer to the curvature section 27, a rotational movement shaft 48 is installed along the vehicle-width direction.

The wall plate sections 47 extend from the bottom plate section toward the opposite side of the curvature section 27 so that the wall plate sections 47 are disposed on both sides of the hole section 35 of the surface section 28. On each of the extending portions of the wall plate sections 47, a rotational movement shaft 49 is installed along the vehicle-width direction.

The rotational movement shaft 49 is disposed at a position separated from the curvature section 27.

A retaining member 52 is rotatably supported on the rotational movement shafts 48 of the supporting sections 45 in a state that the retaining member 52 extends toward the inside of the vehicle interior.

As shown in FIG. 11, the retaining member 52 retains the cover 17 having the opposing section 14 constituting the decoration surface.

The retaining member 52 is press-molded with a plate-shaped steel material. The retaining member 52 includes a pair of extension plate sections 53, a connecting plate section 54, and a pair of opposing plate sections 55.

At the outside of the retaining member 52, the pair of extension plate sections 53 is supported by both ends of the rotational movement shafts 48, respectively. The pair of extension plate sections 53 extends from the ends of the rotational movement shafts 48 toward the inside of the vehicle interior. The connecting plate section 54 connects the distal ends of the extension plate sections 53 to each other. The pair of opposing plate sections 55 extends from the connecting plate section 54 toward the outside of the vehicle interior so as to be disposed opposite to the extension plate sections 53.

On a first extension plate section 53 and a first opposing plate section 55 on a first portion in the vehicle-width direction, a first rotational movement shaft 56 is installed along the vehicle-width direction. On a second extension plate section 53 and a second opposing plate section 55 on a second portion in the vehicle-width direction, a second rotational movement shaft 56 is installed along the vehicle-width direction.

In this case, when the connecting plate section 54 is moved so as to be attached to the cover 17, the opposing section 14 follows the movement of the connecting plate section 54.

A first driving section 58 is disposed so as to connect the rotational movement shaft 56 of the retaining member 52 and the rotational movement shaft 49 of the supporting section 45 on a first portion in the vehicle-width direction. Similarly, a second driving section 58 is disposed so as to connect the rotational movement shaft 56 of the retaining member 52 and the rotational movement shaft 49 of the supporting section 45 on a second portion in the vehicle-width direction.

In this case, each of the driving sections 58 extends from the rotational movement shaft 56 disposed outside the shock absorbing member 25 on the installation side of the driving section to the rotational movement shaft 49 disposed inside the shock absorbing member 25 while passing through the hole section 35 of the surface section 28 and being inserted into the inside of the shock absorbing member 25.

That is, each of the driving sections 58 is provided such that a portion of the driving section is disposed inside the shock absorbing member 25.

Each of the driving sections 58 is configured as a rigid body having a cylinder 60 and a shaft 61 disposed in the cylinder 60 so as to extend toward and retreat from the cylinder 60 by a rotational force of an electric motor M2 (see FIG. 16 for reference) introduced through a lead screw (not shown). The driving section 58 is freely expandable and contractible as a whole.

In the driving section 58, the cylinder 60 is rotatably connected to the rotational movement shaft 49 on the portion which is closer to the shock absorbing member 25, and the shaft 61 is rotatably connected to the rotational movement shaft 56 of the retaining member 52. By the shaft 61 moving toward and away from the cylinder 60, the retaining member 52, i.e., the opposing section 14, is caused to rotate and is moved toward and away from the driver.

The driving sections 58 are driven in a synchronized manner. Specifically, when the driving section 58 is in the contracted state in which the shaft 61 is retracted to the maximum extent, the retaining member 52 is positioned outside the vehicle interior. At this moment, the retaining member 52 and the opposing section 14 of the cover 17 fixed to the retaining member 52 are positioned at a standby position. At the standby position, the retaining member 52 is positioned in such a way that the retaining member 52 is farthest away from the driver, as denoted by the two-dotted line in FIG. 13 and the solid line in FIG. 14. In this case, the front portion of the opposing member 14 is raised toward the inside of the vehicle interior, as denoted by the solid line in FIG. 14.

Meanwhile, when the driving section 58 is in the expanded state in which the shaft 61 is extended to the maximum extent, the retaining member 52 is positioned inside the vehicle interior. At this moment, the retaining member 52 and the opposing section 14 of the cover 17 fixed to the retaining member 52 are positioned in such a way that the retaining member 52 is closest to the driver, as denoted by the two-dotted line in FIGS. 11 and 12 and the solid line in FIG. 13. In this case, the bottom portion of the opposing member 14 is extended from the standby position toward the inside of the vehicle interior. In the expanded state, the bottom portion of the opposing member 14 is slightly sloped with respect to the horizontal plane, as denoted by the two-dotted line in FIG. 14.

The cover 17 and the retaining member 52 constitute a rotational movement section 62 that moves the opposing section 14 toward and away from the driver. For such a configuration, the rotational movement shaft 48 which is the center of the rotational movement of the rotational movement section 62 is disposed on the portion which is closer to the front-vehicle.

The actuatable knee bolster 11 provided on the portion which is closer to the driver's seat 10 is configured to be movable between a standby position and an extending position.

At the standby position, the actuatable knee bolster 11 is received in the instrument panel 3, and the opposing section 14 is farthest away from the driver.

At the extending position, the rotational movement section 62 moves downward while rotating about the rotational movement shaft 48 disposed on the front side of the vehicle, and the opposing section 14 is extended toward the driver.

Accordingly, when the actuatable knee bolster is in the extending position, the lower legs driver are supported by the opposing section 14 at the time of a vehicle collision.

Figure 14:
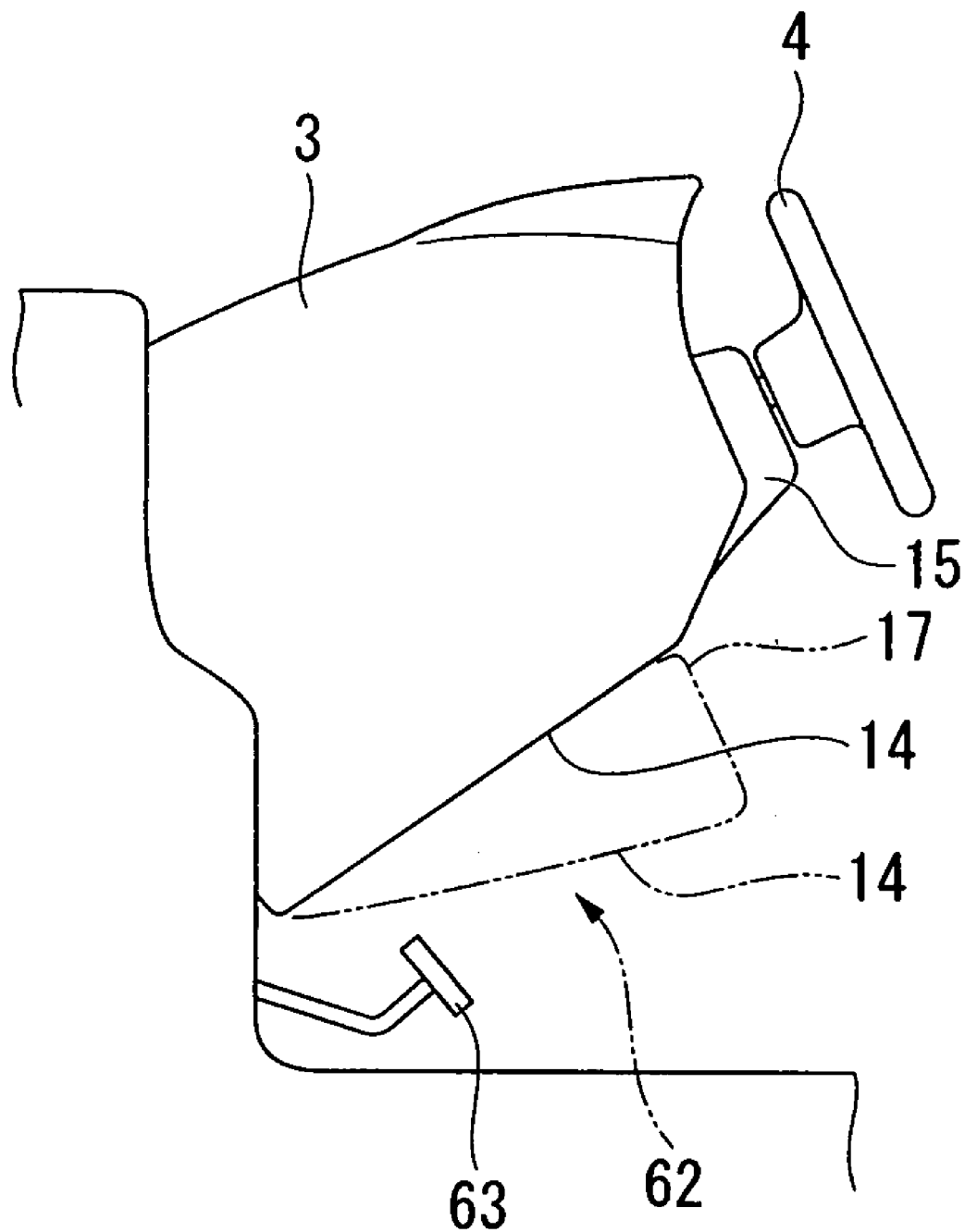
FIG. 14 is a cross-sectional view of a configuration of the actuatable knee bolster and other components such as an instrument panel of the seventh embodiment of the invention.

Specifically, since the feet of the driver seated in the driver's seat 10 are normally placed on a pedal 63 shown in FIG. 14, the leg of the driver is bent in an inverted V shape so that the angle made by the upper and lower parts of the leg decreases as the driver moves toward the front side of the vehicle. In this case, the joint portion of the upper and lower parts of the leg moves upward with the bending. Accordingly, the impact caused by the upward movement of the joint portion of the leg can be efficiently absorbed by the opposing section 14 extending downward from the instrument panel 3 while slightly sloping the bottom portion of the opposing section 14 with respect to the horizontal plane.

When the opposing section 14 receives a load caused by the upward movement of the driver's joint portion at the time of the vehicle collision, the opposing section 14 presses the driving section 58 having the first end thereof connected to the rotational movement shaft 56. As a result, the load is applied to the supporting section 45 backing the rotational movement shaft 49 connected to the second end of the driving section 58. Thus, the surface section 28 on the vehicle interior side of the shock absorbing member 25 fixed to the supporting section 45 receives the load in a direction toward the outside of the vehicle interior.

When the load exceeds a predetermined value, the surface section 28 of the shock absorbing member 25 which is closer to the vehicle interior and which is connected to the driving section 58 is driven to move toward the surface section 26 disposed outside the vehicle interior opposite in the input direction from the lower legs. The curvature section 27 connecting the surface sections 26 and 28 to each other and the connection member 43 are plastically deformed and bent to absorb the impact.

At this moment, the driving section 58 coming closer to the surface section 26 disposed outside the vehicle interior together with the surface section 28 on the vehicle interior side is inserted in the runout section 80 formed in the surface section 26 disposed outside the vehicle interior. Accordingly, the driving section 58 can move directly into the runout section 80 without making contact with the surface section 26.

As shown in FIG. 11, the actuatable knee bolster 313 of the eighth embodiment provided on the portion of the instrument panel 3 which is closer to the passenger seat 12, is provided on the lower portion of the instrument panel 3 so as to protect the lower legs of the occupant seated in the passenger seat 12.

The actuatable knee bolster 313 provided on the passenger seat 12 is configured to move an opposing section 70. The opposing section 70 constitutes a decoration surface of the vehicle interior 2 and is disposed opposite to the lower legs of the driver seated in the driver's seat 10. The actuatable knee bolster 313 allows the opposing section 70 to be extended toward and retreated from the instrument panel 3. The opposing section 70 is extended toward and away from the lower legs of the occupant in a reversible manner.

In FIG. 11, the state in which the opposing section 70 moves away from the occupant is shown with the solid line, and the state in which the opposing section moves toward the occupant is shown with the two-dotted line.

The actuatable knee bolster 313 of the eighth embodiment is provided on the right side (i.e., on the passenger seat 12), as shown in FIG. 12.

Figure 15:
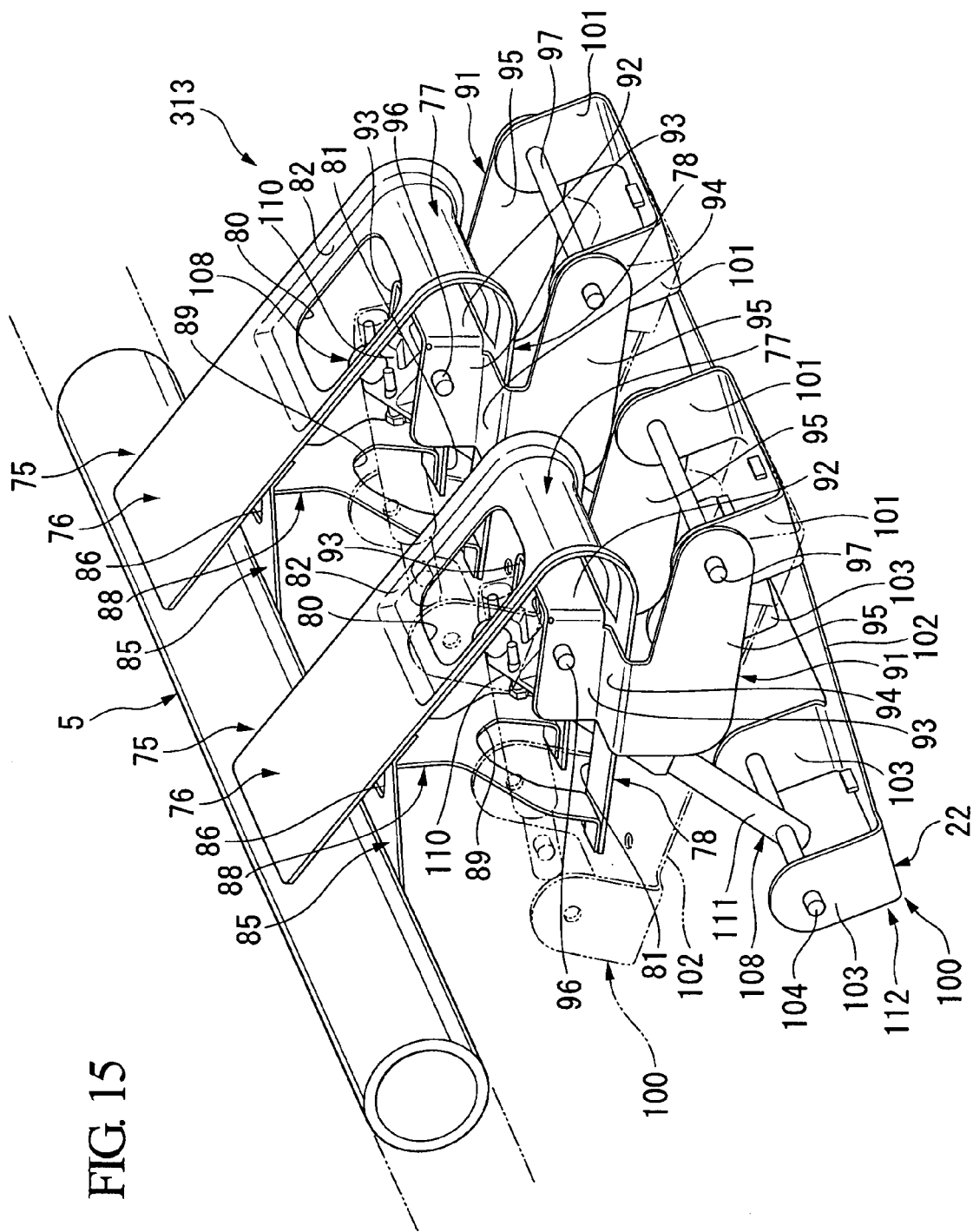
FIG. 15 is a perspective view of a configuration of the actuatable knee bolster of the eighth embodiment of the invention.

FIG. 15 is a perspective view of a configuration of mechanical components excluding a cover 71 shown in FIG. 11. The cover 71 has the opposing section 70 constituting the decoration surface of the actuatable knee bolster 313 of the eighth embodiment.

The actuatable knee bolster 313 includes a plurality of, specifically a pair of, shock absorbing members (shock absorbing sections) 75 that are fixed to the steering support member 5 with a predetermined gap between the members in the vehicle-width direction.

The shock absorbing members 75 are press-molded with a plate-shaped steel material. Each of the shock absorbing members 75 includes a surface section 76 having an entirely flat shape that is fixed to the front side (when viewed by the occupant) of the steering support member 5 and extends toward the inside of the vehicle interior (i.e., toward the occupant), a curvature section (curve section) 77 that is bent from the edge portion on the vehicle interior side of the surface section 76 and is folded back toward the outside of the vehicle interior, and a surface section 78 having an entirely flat shape that extends toward the outside of the vehicle interior from the edge portion of the curvature section 77 opposite to the surface section 76. Each of the shock absorbing members 75 has a substantially U shape when viewed from a side view.

A hole-shaped runout section 80 is formed at a portion of the surface section 76 which is closer to the curvature section 77 and in the central portion of surface section 76 in the vehicle-width direction.

A notch section 81 opened at the outside of the vehicle interior is formed in the central portion of the surface section 78 in the vehicle-width direction disposed opposite to the curvature section 77.

In the shock absorbing member 75, an embossed bead section 82 is formed in the central portion of the shock absorbing member 75 in the vehicle-width direction so as to increase the stiffness of the shock absorbing member 75, and extend from a portion of the surface section 76 disposed closer to the outside of the vehicle interior than the runout section 80 to the curvature section 77 and the surface section 78.

The actuatable knee bolster 213 includes a pair of connection members 85 that are fixed to the steering support member 5 on the lower side corresponding to the attachment positions of the steering support member 5 and the shock absorbing members 75, and extend toward the inside of the vehicle interior so as to be fixed to the corresponding shock absorbing member 75.

The connection members 85 are press-molded with a plate-shaped steel material, and are fixed to a portion of the surface section 76 of the corresponding shock absorbing member 75 disposed closer to the outside of the vehicle interior than the runout section 80.

In each of the connection members 85, a notch section 86 opened at the inside of the vehicle interior is formed in the central portion of the connection member 86 in the vehicle-width direction, and has a substantially inverted C shape when viewed from a plan view.

The actuatable knee bolster 313 also includes a pair of connection members 88 which are fixed to the surface section 76 on the upper side of each of the shock absorbing members 75 and to the surface section 78 on the lower side of each of the shock absorbing members 75, while passing through the notch section 86 of the connection member 85 and extending downward.

The connection members 88 are also press-molded with a plate-shaped steel material. The connection members 88 are shaped such that the widths thereof increase as they go downward. A notch section 89 opened downward is formed in the central portion of the connection member 88 in the vehicle-width direction. The connection member has a substantially inverted Y shape when viewed from the front view.

In each of the shock absorbing members 75, a supporting section 91 is fixed to the top surface of the surface section 78 on the lower side of the shock absorbing member 75, and the supporting section 91 is press-molded with a plate-shaped steel material.

The supporting section 91 includes an intermediate plate section 92 extending in the vehicle-width direction from a portion of the surface section 78 which is closer to the curvature section 77, a pair of wall plate sections 93 bent from both sides in the vehicle-width direction of the intermediate plate section 92 and extending toward the outside of the vehicle interior, a pair of bottom plate sections 94 (only a single section is shown in the drawing) extending away from the lower edge portions of the wall plate sections 93 and fixed to a portion of the surface section 78 disposed closer to the curvature section 77 than the notch section 81, and a pair of backing plate sections 95 bend downward from both edge portions in the vehicle-width direction of the bottom plate section 94 and extending toward the inside of the vehicle interior.

On the wall plate sections 93, a first rotational movement shaft 96 is installed along the vehicle-width direction. On the backing plate sections 95, a second rotational movement shaft 97 is installed along the vehicle-width direction.

A retaining member 100 for retaining the cover 71 including the opposing section 70 constituting the decoration surface is rotatably supported on the rotational movement shafts 97 of the supporting sections 91.

The retaining member 100 is press-molded with a plate-shaped steel material. The retaining member 100 includes two pairs of extension plate sections 101 connected to the respective ends of the rotational movement shafts 97 and extending toward the inside of the vehicle interior, a main plate section 102 connecting the respective distal ends of the extension plate sections 101 to each other and extending toward the outside of the vehicle interior, and two pairs of backing plate sections 103 extending upward from a portion of the main plate section 102 disposed outside the vehicle interior.

On the pair of backing plate sections 103 on the vehicle-width direction, a first rotational movement shaft 104 is installed along the vehicle-width direction. On the pair of backing plate sections 103 on the vehicle-width direction, a second rotational movement shaft 104 (although not shown in the drawing) is installed along the vehicle-width direction.

In this case, when the main plate section 102 is moved so as to be attached to the cover 71, the opposing section 70 follows the movement of the main plate section 102.

A first driving section 108 is disposed so as to connect the rotational movement shaft 104 of the retaining member 100 and the rotational movement shaft 96 of the supporting section 91 on the vehicle-width direction. Similarly, a second driving section 108 is disposed so as to connect the rotational movement shaft 104 of the retaining member 100 and the rotational movement shaft 96 of the supporting section 91 on the vehicle-width direction.

In this case, each of the driving sections 108 extends from the rotational movement shaft 104 disposed outside the shock absorbing member 75 on the installation side of the driving section to the rotational movement shaft 96 disposed inside the shock absorbing member 75 while passing through the notch section 81 of the surface section 78 and being inserted into the inside of the shock absorbing member 75.

That is, each of the driving sections 108 is provided such that a portion of the driving section is disposed inside the shock absorbing member 75.

Each of the driving sections 108 is configured as a rigid body having a cylinder 110 and a shaft 111 disposed in the cylinder 110 so as to extend toward and retreat from the cylinder 110 by a rotational force of an electric motor M2 (see FIG. 16 for reference) introduced through a lead screw (not shown). The driving section 108 is freely expandable and contractible as a whole.

In the driving section 108, the cylinder 110 is rotatably connected to the rotational movement shaft 96 which is closer to the shock absorbing member 75, and the shaft 111 is rotatably connected to the rotational movement shaft 104 of the retaining member 100. By the shaft 111 moving toward and away from the cylinder 110, the retaining member 100 is caused to rotate and is moved toward and away from the occupant.

In this case, the driving sections 108 are driven in a synchronized manner.

Specifically, when the driving section 108 is in the contracted state in which the shaft 111 is retracted to the maximum extent, the retaining member 100 is positioned outside the vehicle interior, as denoted by the two-dotted line in FIG. 8. At this moment, the opposing section 70 of the cover 71 retained by the retaining member 100 is positioned at a standby position. At the standby position, the retaining member 100 is positioned in such a way that the retaining member 100 is farthest away from the occupant in a state in which the front portion of the opposing section 70 is raised toward the inside of the vehicle interior.

Meanwhile, when the driving section 108 is in the expanded state in which the shaft 111 is extended to the maximum extent, the retaining member 100 is positioned inside the vehicle interior, as denoted by the solid line in FIG. 8. At this moment, the retaining member 100 is positioned in such a way that the retaining member 100 is closest to the occupant. In this case, the front portion of the opposing member 14 is raised from the standby position toward the inside of the vehicle interior while making a substantially right angle.

The cover 71 and the retaining member 100 constitute a rotational movement section 112 that moves the opposing section 70 toward and away from the driver. For such a configuration, the rotational movement shaft 97 which is the center of the rotational movement of the rotational movement section 112 is disposed on the rear side of the vehicle.

The actuatable knee bolster 313 provided on the passenger seat 12 is configured to be movable between a standby position and an extending position.

At the standby position, the actuatable knee bolster 313 is received in the instrument panel 3, and the opposing section 70 is farthest away from the occupant seated in the passenger seat 12.

At the extending position, the rotational movement section 112 moves downward while rotating about the rotational movement shaft 97 disposed on the rear side of the vehicle, and the opposing section 70 is extended toward the occupant.

Accordingly, when the actuatable knee bolster is in the extending position, the lower legs of the occupant are supported by the opposing section 70 at the time of a vehicle collision.

Specifically, since the feet of the occupant seated in the passenger seat 12 are not normally placed on the pedal, the legs of the occupant are moved forward without being bent as the occupant moves toward the front side of the vehicle. Accordingly, the impact caused by the forward movement of the legs can be efficiently absorbed by the opposing section 70 extending downward from the instrument panel 3 while making a substantially right angle.

Specifically, when the retaining member 100 receives a load from the occupant at the time of the vehicle collision, the retaining member 100 presses the driving section 108 having the first end thereof connected to the rotational movement shaft 104. As a result, the load is applied to the supporting section 91 backing the rotational movement shaft 96 connected to the second end of the driving section 108. Thus, the surface section 78 on the lower side of the shock absorbing member 75 fixed to the supporting section 91 receives the load in such a direction that the front portion of the surface section 78 is raised.

When the load exceeds a predetermined value, the surface section 78 of the shock absorbing member 75 connected to the driving section 108 is driven to move toward the surface section 76 disposed on the upper side of the shock absorbing member 75 opposite in the input direction from the lower legs, i.e., in such a direction that the front portion thereof is raised. The curvature section 77 connecting the surface sections 76 and 78 to each other and the connection member 88 are plastically deformed and bent to absorb the impact.

At this moment, the driving section 108 coming closer to the surface section 76 disposed on the upper side together with the surface section 78 disposed on the lower side is inserted in the runout section 80 formed in the surface section 76 disposed on the upper side. Accordingly, the driving section 108 can move directly into the runout section 80 without making contact with the surface section 76.

Figure 16:
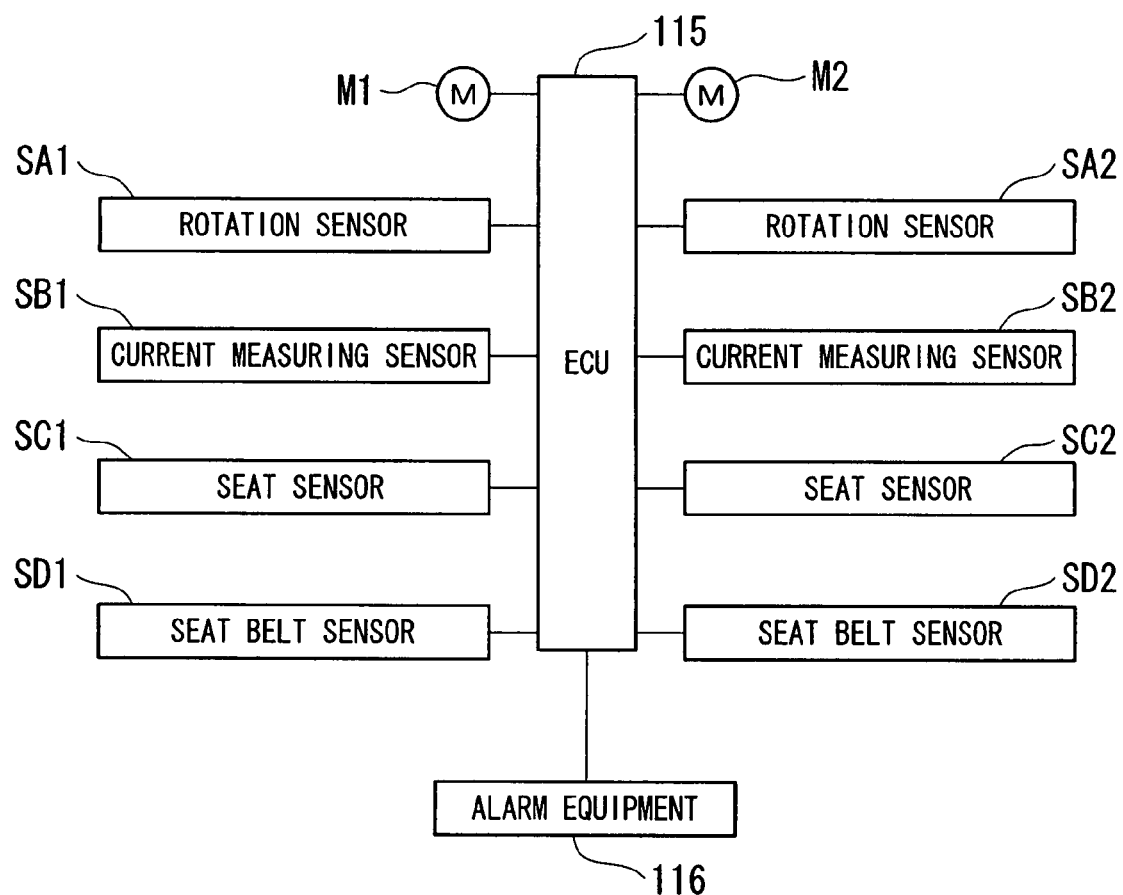
FIG. 16 is a block diagram showing a configuration of a control system of the actuatable knee bolster of the seventh embodiment and eighth embodiment of the invention.

In the above-described actuatable knee bolsters 11 and 313 of the seventh and eighth embodiments, respectively disposed on the sides of the driver's seat 10 and the passenger seat 12, the respective electric motors M1 and M2 are individually controlled by an ECU 115 (a control unit) shown in FIG. 16 commonly provided to the actuatable knee bolsters 11 and 313.

The actuatable knee bolster 11 of the seventh embodiment includes a rotation sensor SA1, a current measuring sensor (current measuring section) SB1, a seat sensor SC1, and a seat belt sensor SD1.

The rotation sensor SA1 detects the rotation speed and position of the electric motor M1. The current measuring sensor SB1 detects a current value of the electric motor M1. The seat sensor SC1 detects whether the driver is seated in the driver's seat 10. The seat belt sensor SD1 detects whether driver seated in the driver's seat 10 is wearing a seat belt equipment (not shown).

The detection signals obtained from the rotation sensor SA1, the current measuring sensor SB1, the seat sensor SC1, and the seat belt sensor SD1 are transmitted to the ECU 115.

The actuatable knee bolster 313 of the eighth embodiment includes a rotation sensor SA2, a current measuring sensor (current measuring section) SB2, a seat sensor SC2, and a seat belt sensor SD2.

The rotation sensor SA2 detects the rotation speed and position of the electric motor M2. The current measuring sensor SB2 detects a current value of the electric motor M2. The seat sensor SC2 detects whether the occupant is seated in the passenger seat 12. The seat belt sensor SD2 detects whether the occupant seated in the passenger seat 12 is wearing the seat belt equipment (not shown).

The detection signals obtained from the rotation sensor SA2, the current measuring sensor SB2, the seat sensor SC2, and the seat belt sensor SD2 are also transmitted to the ECU 115.

The rotation sensor SA1 detects rotation pulses of the electric motor M1 every predetermined rotation angle. Similarly, the rotation sensor SA2 detects rotation pulses of the electric motor M2 every predetermined rotation angle. The ECU 115 detects the rotation speed and position of each of the electric motors M1 and M2 on the basis of the respective rotation pulses.

Each of the current measuring sensors SB1 and SB2 is configured as a resistor. The ECU 115 monitors a voltage value flowing in the resistor so as to detect the current value.

An alarm equipment 116 such as a buzzer for generating an alarm signal in the vehicle interior commonly provided to the actuatable knee bolsters 11 and 313 of the seventh and eighth embodiments. The alarm equipment 116 is connected to the ECU 115.

The ECU 115 controls the electric motor M1 of the actuatable knee bolster 11 of the seventh embodiment provided on the driver's seat 10 on the basis of the detection signals obtained from the rotation sensor SA1, the current measuring sensor SB1, the seat sensor SC1, and the seat belt sensor SD1. Similarly, the ECU 115 controls the electric motor M2 of the actuatable knee bolster 313 of the eighth embodiment provided on the passenger seat 12 on the basis of the detection signals obtained from the rotation sensor SA2, the current measuring sensor SB2, the seat sensor SC2, and the seat belt sensor SD2.

Here, the actuatable knee bolster 11 and 313 of the seventh and eighth embodiments are controlled in the same manner. Hereinafter, control operations related to the actuatable knee bolster 11 of the seventh embodiment provided on the driver's seat 10 will be described from when the driver gets in the vehicle.

In a state where the driver is not seated in the driver's seat 10, i.e., when the seat sensor SC1 cannot detect that the driver is seated and when the seat belt sensor SD1 cannot detect that the driver is wearing the seat belt equipment, the actuatable knee bolster 11 is in the standby position in which the opposing section 14 is farthest away from the driver.

Thereafter, when the driver sits on the driver's seat 10, the seat sensor SC1 detects that the driver is seated. Unless the ECU 115 receives the detection signal from the seat belt sensor SD1 that the driver has worn the seat belt equipment, the ECU 115 drives the electric motor M1 in response to the detection signal from the seat sensor SC1. Then, the rotational movement section 62 rotates about the rotational movement shaft 48 disposed on the front side of the vehicle, and the rotational movement section 62 moves downward. Therefore, the opposing section 14 extends toward the driver.

Figure 17:
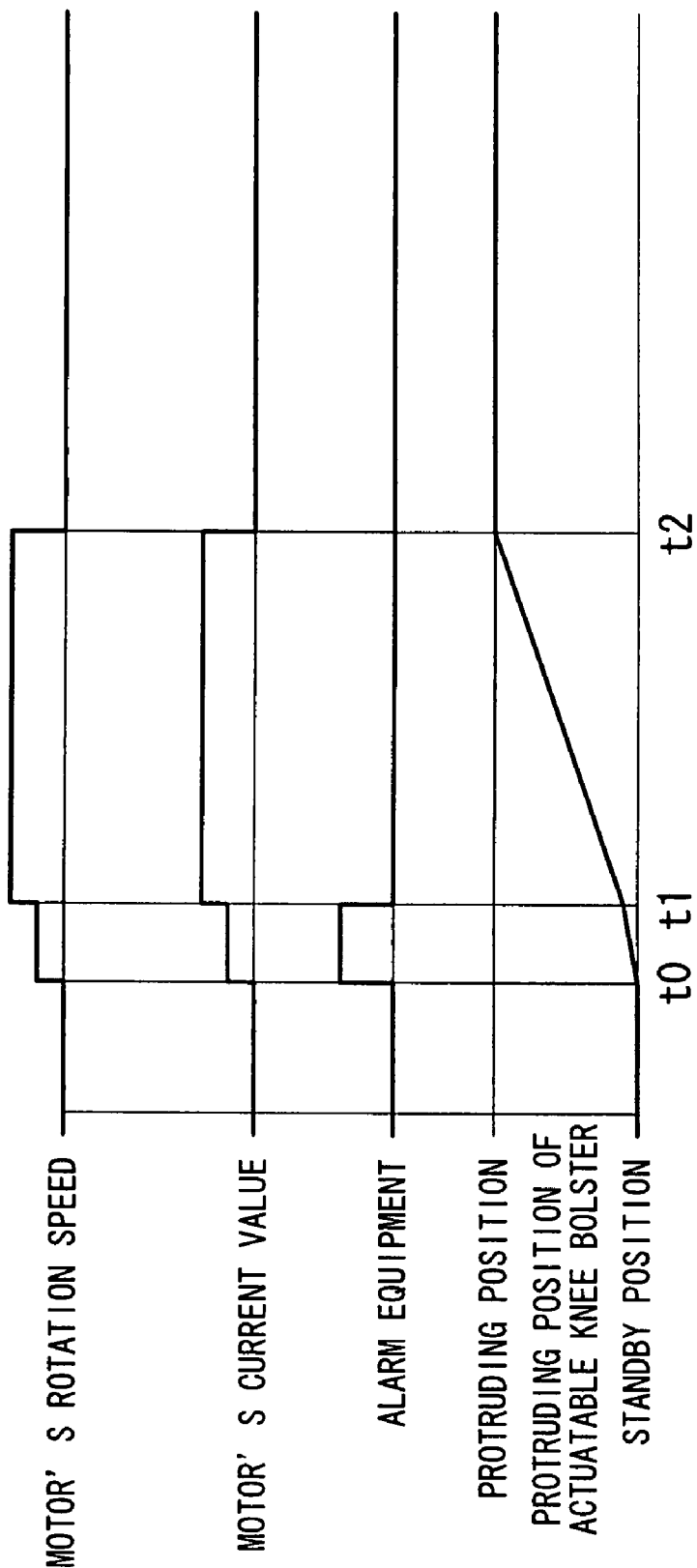
FIG. 17 is a timing chart showing an example of the operation of the actuatable knee bolster of the seventh embodiment of the invention.

In this case, as shown in FIG. 17, in a period between t0 (rotation starting time of the electric motor M1) and t1 (a predetermined initialization period after t0), the ECU 115 controls the electric motor M1 in a feedback manner so that the rotation speed detected by the rotation sensor SA1 is maintained at a first predetermined value corresponding to a low speed. In the above period, i.e., between t0 and t1, an alarm signal (continuous alarm) is generated by the alarm equipment 116.

Then, in a period between t1 and t2 (corresponding to the extending position), the ECU 115 controls the electric motor M1 so that the rotation speed detected by the rotation sensor SA1 is maintained at a second predetermined value corresponding to a speed greater than the first predetermined value.

In this manner, in the initial forward movement period t0 to t1, the ECU 115 causes the opposing section 14 to move forward at a low speed while instructing the alarm equipment 116 to signal the forward movement. Thereafter, in the period t1 to t2, i.e., until the opposing section 14 stops at the extending position, the ECU 115 causes the opposing section 14 to move at a relatively high speed.

Specifically, the movement speed of the opposing section 14 is gradually increased.

In the course of the forward movement of the opposing section 14 or in the extending position, if the seat belt sensor SD1 detects that the driver is wearing the seat belt equipment or the seat sensor SC1 cannot detect that driver is seated, the ECU 115 drives the electric motor M1 in a reverse direction so as to return the opposing section 14 to the standby position.

The actuatable knee bolster 11 extends to the extending position when the driver is not wearing the seat belt equipment of the driver's seat 10. With such a configuration, the driver can promptly wear the seat belt equipment so that the space for the lower legs is not reduced.

That is, the actuatable knee bolster 11 can function as a reminder for the driver to wear the sea belt equipment.

In the course of the forward movement of the opposing section 14 by the normal rotation the electric motor M1, when the rotation speed of the electric motor M1 detected by the rotation sensor SA1 becomes lower than the allowable value, the ECU 115 determines that the opposing section 14 is brought into contact with an object at that moment tc1. That is, as shown in FIG. 18, in a period from t1 until the opposing section 14 is positioned at the extending position, when the rotation speed of the electric motor M1 becomes lower than the allowable range of the second predetermined value, the ECU 115 determines that the opposing section 14 is brought into contact with an object at that moment tc1. The ECU 115 drives the electric motor M1 in a reverse direction at a predetermined rotation speed for a predetermined period so as to move the opposing section 14 backward by a predetermined distance from the position at that moment tc1. In the course of the backward movement of the opposing section 14, an alarm signal (intermittent alarm) different form that in the initial forward movement period is generated by the alarm equipment 116.

In tc2, i.e., after a predetermined reverse rotation period, the ECU 115 stops the electric motor M1 and waits for a predetermined standby period. In tc3, i.e., after the predetermined standby period, the ECU 115 drives the electric motor M1 in the normal direction.

In this case, in a similar manner to the case of the initial forward movement period, until tc4, the ECU 115 controls the electric motor M1 so that the rotation speed detected by the rotation sensor SA1 is maintained at a first predetermined value corresponding to a low speed. In the above period, i.e., between t0 and t1, an alarm signal (continuous alarm) is generated by the alarm equipment 116.

Then, in a period between t4 and t5 (corresponding to the extending position), the ECU 115 controls the electric motor M1 so that the rotation speed detected by the rotation sensor SA1 is maintained at a second predetermined value corresponding to a high speed greater than the first predetermined value.

In this manner, when the forward movement of the opposing section 14 is interrupted in the course of the forward movement, the ECU 115 causes the opposing section 14 to move backward by a predetermined distance, waits for a predetermined period, and retries to move forward the opposing section 14 (such an operation will be referred to as a retry operation).

FIG. 18 shows the case where the opposing section 14 is moved to the extending position by performing the retry operation twice. However, if the opposing section 14 cannot be moved to the extending position even through several retry operations, the opposing section 14 is returned to the standby position, for example.

In this case, when the forward movement of the opposing section 14 is interrupted, the rotation speed of the electric motor M1 is lowered and the current value supplied to the electric motor M1 is raised in order to maintain the rotation speed by the feedback control.

When the current value supplied to the electric motor M1 becomes greater than the allowable range of the second predetermined value corresponding to a suitable rotation speed in a non-interruption situation, the ECU 115 may determine that the opposing section 14 is brought into contact with an obstacle at that moment tc1. Thereafter, similar operations such as backward movement, waiting, and the retry operation may be performed.

When the decrease in the rotation speed and the increase in the current value are monitored and it is determined that the forward movement of the opposing section 14 is interrupted by either of the decrease in the rotation speed and the increase in the current value, similar operations such as the backward movement, the waiting, and the retry operation may be performed.

For a predetermined time before t2 when the opposing section 14 is positioned at the extending position, the rotation speed of the electric motor M1 may be set to a third predetermined value smaller than the second predetermined value.

With such a configuration, the movement speed of the opposing section 14 can be gradually decreased in the final forward movement period of the opposing section 14. Accordingly, it is possible to realize a smooth operation of the actuatable knee bolster, thus increasing the value as a product.

According to the actuatable knee bolster 11 of the seventh embodiment described above, the change in the forward and backward movement speed of the opposing section 70 can be detected by either of the rotation speed of the electric motor M1 detected by the rotation sensor SA1 and the current value of the electric motor M1 detected by the current measuring sensor SB1. Therefore, when the forward movement of the opposing section 70 is interrupted by an obstacle such as a baggage placed between the standby position and the extending position of the opposing section 70 and thus the movement speed of the opposing section 70 is decreased, the decrease in the movement speed of the opposing section 70 can be detected by detecting the change in the rotation speed of the electric motor M1. Accordingly, it is possible to control the actuatable knee bolster in accordance with various situations.

In the invention, in order to detect the state of the driver in the driver's seat 10, a door sensor for detecting the closed or open state of the door on the driver's seat 10 may be used in addition to the seat sensor SC1 for detecting whether the driver is seated in the driver's seat 10 and the seat belt sensor SD1 for detecting whether the driver seated in the driver's seat 10 is wearing a seat belt equipment (not shown). Moreover, in order to detect the state of the occupant in the passenger seat 12, a door sensor for detecting the closed or open state of the door on the passenger seat 12 may be used in addition to the seat sensor SC2 for detecting whether the occupant is seated in the passenger seat 12 and the seat belt sensor SD2 for detecting whether the occupant seated in the passenger seat 12 is wearing the seat belt equipment (not shown).

What is claimed is:

1. An actuatable knee bolster provided in an instrument panel of a vehicle, said knee bolster actuatable in the event of a collision to protect lower legs of an occupant seated facing forward in a front seat of the vehicle, the actuatable knee bolster comprising:
    a steering support member extending substantially the width of the instrument panel;
    an opposing section situated so as to be opposed to the lower legs of the occupant;
    a driving section for driving the opposing section to selectively move toward or away from the occupant, the driving section having a first end portion oriented toward a front end of the vehicle, and a second end portion opposite the first end; and
    a shock absorbing section operatively attached to the steering support member and configured to be plastically deformed when making contact with the lower legs of the occupant, wherein
    one of said end portions of the driving section is disposed inside the shock absorbing section.

2. The actuatable knee bolster according to claim 1, wherein the shock absorbing section includes:
    a first surface section to which the driving section is operatively connected;
    a second surface section spaced apart from the first surface section in an input direction from the lower legs, said second surface section having an end portion which is affixed to the steering support member;
    a hollow runout section formed in the second surface section so that the driving section is inserted in the runout section when the shock absorbing section is plastically deformed; and
    a curve section connecting the first surface section and the second surface section, thereby configuring the shock absorbing section in a substantially U-shape.

3. The actuatable knee bolster according to claim 2, wherein
    the driving section is connected to a portion separated from the curve section of the shock absorbing section.

4. The actuatable knee bolster according to claim 1, wherein
    the shock absorbing section is disposed on a portion of the steering support member which is adjacent to a driver's seat of the vehicle, and wherein the opposing section rotates about a pivot axis which is disposed proximate a lower end of the shock absorbing section and at a front side of the opposing section.

5. The actuatable knee bolster according to claim 1, wherein
    the shock absorbing section is disposed on a portion of the steering support member which is adjacent to a front passenger seat of the vehicle, and wherein the opposing section rotates about a pivot axis which is disposed at a rear side of the opposing section.

6. The actuatable knee bolster according to claim 1, wherein
    the opposing section is configured to extend toward and retreat from the instrument panel, has a cutout formed therein to accommodate a steering column, and is disposed proximate a portion of a steering column cover.

7. An actuatable knee bolster provided in an instrument panel of a vehicle to protect lower legs of an occupant seated in a front seat of the vehicle, the actuatable knee bolster comprising:
    an opposing section opposed to the lower legs of the occupant;
    a driving section driving the opposing section to selectively move toward an occupant and into an extended position, or away from the occupant into a standby position by a driving force of a motor;
    a shock absorbing section configured to be plastically deformed when making contact with the lower legs of the occupant; and
    a rotation sensor configured to measure a rotation speed of the motor, the rotation speed supplied to an ECU to control the motor.

8. The actuatable knee bolster according to claim 7, further comprising
    a current measuring section configured to measure a current value of the electricity drawn by the motor and supplied to an ECU to control the motor.

9. The actuatable knee bolster according to claim 7, further comprising:
    a current measuring section configured to measure a current value of the electricity drawn by the motor; and
    a control section controlling the motor on the basis of the detection result obtained from at least one of the rotation sensor and the current measuring section.

10. The actuatable knee bolster according to claim 7, further comprising:
    an opposing section, driving section and shock absorbing section provided adjacent each of the drivers seat and the passengers seat, and a motor provided for each driving section to individually control and operate each knee bolster depending on sensor readings used to determine what seat is occupied.

11. An actuatable knee bolster assembly provided in an instrument panel of a vehicle, said knee bolster assembly being actuatable in the event of a collision to protect lower legs of at least one occupant seated facing forward in at least one front seat of the vehicle, the actuatable knee bolster assembly comprising:
    a steering support member extending substantially the width of the instrument panel;
    a first knee bolster attached to the steering support member and disposed proximate a driver's side of the vehicle; and a second knee bolster attached to the steering support member and disposed proximate a passenger's side of the vehicle;
    the first knee bolster comprising:
        an opposing section situated so as to be opposed to the lower legs of a driver, the opposing section having a cutout formed therein to accommodate a portion of a steering column;

a driving section for driving the opposing section to selectively move toward or away from the occupant, the driving section having a first end oriented toward a front end of the vehicle, and a second end opposite the first end; and a shock absorbing section operatively attached to the steering support member and configured to be plastically deformed when making contact with the lower legs of the occupant, said shock absorbing section comprising:

a first surface section to which the driving section is operatively connected;

a second surface section spaced apart from the first surface section in an input direction from the lower legs, said second surface section having an end portion which is affixed to the steering support member;

a hollow runout section formed in the second surface section so that the driving section is inserted in the runout section when the shock absorbing section is plastically deformed; and a curve section connecting the first surface section and the second surface section, thereby configuring the shock absorbing section in a substantially U-shape, the second knee bolster comprising:

an opposing section situated so as to be opposed to the lower legs of the occupant;

a driving section for driving the opposing section to selectively move toward or away from the occupant, the driving section having a first end oriented toward a front end of the vehicle, and a second end opposite the first end; and a shock absorbing section operatively attached to the steering support member and configured to be plastically deformed when making contact with the lower legs of the occupant, a first surface section to which the driving section is operatively connected;

a second surface section spaced apart from to the first surface section in an input direction from the lower legs, said second surface section having an end portion which is affixed to the steering support member;

a hollow runout section formed in the second surface section so that the driving section is inserted in the runout section when the shock absorbing section is plastically deformed; and a curve section connecting the first surface section and the second surface section, thereby configuring the shock absorbing section in a substantially U-shape, wherein the first end portion of the first knee bolster's driving section is disposed inside the shock absorbing section thereof, and the second end portion of the second knee bolster's driving section is disposed inside the shock absorbing section thereof.

* * * * *